United States Patent
Molin et al.

(10) Patent No.: US 9,014,525 B2
(45) Date of Patent: Apr. 21, 2015

(54) TRENCH-ASSISTED MULTIMODE OPTICAL FIBER

(71) Applicant: Draka Comteq B.V., Amsterdam (NL)

(72) Inventors: Denis Molin, Draveil (FR); Pierre Sillard, Le Chesnay (FR); Marianne Bigot-Astruc, Marcoussis (FR)

(73) Assignee: Draka Comteq, B.V., Amsterdam (NL)

( * ) Notice: Subject to any disclaimer, the term of this patent is extended or adjusted under 35 U.S.C. 154(b) by 63 days.

(21) Appl. No.: 13/627,351

(22) Filed: Sep. 26, 2012

(65) Prior Publication Data

US 2013/0028564 A1    Jan. 31, 2013

Related U.S. Application Data

(63) Continuation-in-part of application No. 12/878,449, filed on Sep. 9, 2010, now Pat. No. 8,520,993, and a continuation-in-part of application No. 12/953,948, filed on Nov. 24, 2010, now Pat. No. 8,280,213, and a (Continued)

(30) Foreign Application Priority Data

| Sep. 9, 2009 | (FR) | 09 04305 |
| Nov. 25, 2009 | (FR) | 09 58381 |
| Nov. 25, 2009 | (FR) | 09 58382 |
| Dec. 3, 2009 | (FR) | 09 58637 |
| Dec. 3, 2009 | (FR) | 09 58639 |
| Mar. 2, 2010 | (FR) | 10 51489 |

(51) Int. Cl.
*G02B 6/036* (2006.01)
*G02B 6/028* (2006.01)

(52) U.S. Cl.
CPC ............ *G02B 6/0288* (2013.01); *G02B 6/0365* (2013.01)

(58) Field of Classification Search
CPC ........................... G02B 6/0288; G02B 6/0365
See application file for complete search history.

(56) References Cited

U.S. PATENT DOCUMENTS

| 4,111,525 A | 9/1978 | Kaminow et al. |
| 4,114,980 A | 9/1978 | Asam et al. |
| 4,184,744 A | 1/1980 | Onoda et al. |
| 4,194,807 A | 3/1980 | Gliemeroth |
| 4,222,631 A | 9/1980 | Olshansky |

(Continued)

FOREIGN PATENT DOCUMENTS

| EP | 1164393 A | 12/2001 |
| EP | 1727302 A1 | 11/2006 |

(Continued)

OTHER PUBLICATIONS

Sasaki, P.L. Francois, D.N. Payne, "Accuracy and resolution of preform index-profiling by the spatial-filtering method," ECOC'81, 6.4-1, Copenhagen, Denmark.

(Continued)

*Primary Examiner* — Jerry Rahll
(74) *Attorney, Agent, or Firm* — Additon, Higgins & Pendleton, P.A.

(57) ABSTRACT

A trench-assisted, multimode optical fiber includes a central core having an alpha refractive index profile with respect to an outer cladding. The optical fiber also includes an inner cladding, a depressed trench, and an outer cladding. The optical fiber achieves reduced bending losses and a high bandwidth.

41 Claims, 11 Drawing Sheets

Related U.S. Application Data continuation-in-part of application No. 12/954,036, filed on Nov. 24, 2010, now Pat. No. 8,483,535, and a continuation-in-part of application No. 12/959,688, filed on Dec. 3, 2010, now Pat. No. 8,406,593, and a continuation-in-part of application No. 12/959,866, filed on Dec. 3, 2010, now Pat. No. 8,428,410, and a continuation-in-part of application No. 13/037,943, filed on Mar. 1, 2011, now Pat. No. 8,565,568.

(60) Provisional application No. 61/539,346, filed on Sep. 26, 2011, provisional application No. 61/241,592, filed on Sep. 11, 2009, provisional application No. 61/265,101, filed on Nov. 30, 2009, provisional application No. 61/265,115, filed on Nov. 30, 2009, provisional application No. 61/266,746, filed on Dec. 4, 2009, provisional application No. 61/266,754, filed on Dec. 4, 2009, provisional application No. 61/323,619, filed on Apr. 13, 2010.

(56) References Cited

U.S. PATENT DOCUMENTS

| | | |
|---|---|---|
| 4,229,070 A | 10/1980 | Olshansky et al. |
| 4,230,396 A | 10/1980 | Olshansky et al. |
| 4,339,174 A | 7/1982 | Levin |
| 4,358,181 A | 11/1982 | Gulati et al. |
| 4,372,647 A | 2/1983 | Okamoto et al. |
| 4,406,517 A | 9/1983 | Olshansky |
| 4,432,606 A | 2/1984 | Blair |
| 4,465,335 A | 8/1984 | Eppes |
| 4,616,901 A | 10/1986 | MacChesney et al. |
| 4,636,235 A | 1/1987 | Glessner et al. |
| 4,636,236 A | 1/1987 | Glessner et al. |
| 4,653,042 A | 3/1987 | d'Auria et al. |
| 4,715,695 A | 12/1987 | Nishimura et al. |
| 4,723,828 A | 2/1988 | Garel-Jones et al. |
| 4,838,643 A | 6/1989 | Hodges et al. |
| 4,840,653 A | 6/1989 | Rabinovich |
| 5,115,486 A | 5/1992 | Bader et al. |
| 5,142,603 A | 8/1992 | Forrester |
| 5,194,714 A | 3/1993 | Le Sergent |
| 5,278,687 A | 1/1994 | Jannson et al. |
| 5,381,503 A | 1/1995 | Kanamori et al. |
| 5,522,007 A | 5/1996 | Drouart et al. |
| 5,574,816 A | 11/1996 | Yang et al. |
| 5,702,497 A | 12/1997 | Oh et al. |
| 5,717,805 A | 2/1998 | Stulpin |
| 5,761,362 A | 6/1998 | Yang et al. |
| 5,841,933 A | 11/1998 | Hoaglin et al. |
| 5,911,023 A | 6/1999 | Risch et al. |
| 5,982,968 A | 11/1999 | Stulpin |
| 6,002,818 A | 12/1999 | Fatehi et al. |
| 6,035,087 A | 3/2000 | Bonicel et al. |
| 6,066,397 A | 5/2000 | Risch et al. |
| 6,085,009 A | 7/2000 | Risch et al. |
| 6,134,363 A | 10/2000 | Hinson et al. |
| 6,175,677 B1 | 1/2001 | Yang et al. |
| 6,181,857 B1 | 1/2001 | Emeterio et al. |
| 6,185,346 B1 | 2/2001 | Asawa et al. |
| 6,202,447 B1 | 3/2001 | Drouart et al. |
| 6,210,802 B1 | 4/2001 | Risch et al. |
| 6,215,931 B1 | 4/2001 | Risch et al. |
| 6,269,663 B1 | 8/2001 | Drouart et al. |
| 6,292,603 B1 | 9/2001 | Mizuochi et al. |
| 6,292,612 B1 | 9/2001 | Golowich et al. |
| 6,314,224 B1 | 11/2001 | Stevens et al. |
| 6,321,012 B1 | 11/2001 | Shen |
| 6,321,014 B1 | 11/2001 | Overton et al. |
| 6,334,016 B1 | 12/2001 | Greer, IV |
| 6,381,390 B1 | 4/2002 | Hutton et al. |
| 6,470,126 B1 | 10/2002 | Mukasa |
| 6,490,398 B2 | 12/2002 | Gruner-Nielsen et al. |
| 6,493,491 B1 | 12/2002 | Shen et al. |
| 6,580,863 B2 | 6/2003 | Yegnanarayanan et al. |
| 6,603,908 B2 | 8/2003 | Dallas et al. |
| 6,606,437 B1 | 8/2003 | Mukasa et al. |
| 6,618,534 B2 | 9/2003 | Abbott, III et al. |
| 6,618,538 B2 | 9/2003 | Nechitailo et al. |
| 6,658,184 B2 | 12/2003 | Bourget et al. |
| 6,724,965 B2 | 4/2004 | Abbott et al. |
| 6,724,966 B2 | 4/2004 | Mukasa |
| 6,735,985 B2 | 5/2004 | DiGiovanni et al. |
| 6,749,446 B2 | 6/2004 | Nechitailo |
| 6,750,294 B2 | 6/2004 | Sugiyama et al. |
| 6,771,865 B2 | 8/2004 | Blaszyk et al. |
| 6,904,218 B2 | 6/2005 | Sun et al. |
| 6,912,347 B2 | 6/2005 | Rossi et al. |
| 6,922,515 B2 | 7/2005 | Nechitailo et al. |
| 6,941,049 B2 | 9/2005 | Risch et al. |
| 6,959,137 B2 | 10/2005 | Kalish et al. |
| 7,006,751 B2 | 2/2006 | Provost et al. |
| 7,043,126 B2 | 5/2006 | Guan et al. |
| 7,043,128 B2 | 5/2006 | DiGiovanni et al. |
| 7,045,010 B2 | 5/2006 | Sturman, Jr. |
| 7,089,765 B2 | 8/2006 | Schaper et al. |
| 7,162,128 B2 | 1/2007 | Lovie et al. |
| 7,228,032 B2 | 6/2007 | Blauvelt et al. |
| 7,315,677 B1 | 1/2008 | Li et al. |
| 7,322,122 B2 | 1/2008 | Overton et al. |
| 7,346,244 B2 | 3/2008 | Gowan et al. |
| 7,356,234 B2 | 4/2008 | de Montmorillon et al. |
| 7,400,835 B2 | 7/2008 | Sardesai et al. |
| 7,406,235 B2 | 7/2008 | Guan et al. |
| 7,421,172 B2 | 9/2008 | Matthijse et al. |
| 7,421,174 B2 | 9/2008 | Fleming, Jr. et al. |
| 7,483,612 B2 | 1/2009 | Digiovanni et al. |
| 7,483,613 B2 | 1/2009 | Bigot-Astruc et al. |
| 7,515,795 B2 | 4/2009 | Overton et al. |
| 7,526,177 B2 | 4/2009 | Matthijsse et al. |
| 7,539,381 B2 | 5/2009 | Chen et al. |
| 7,555,186 B2 | 6/2009 | Flammer et al. |
| 7,567,739 B2 | 7/2009 | Overton et al. |
| 7,570,852 B2 | 8/2009 | Nothofer et al. |
| 7,574,095 B2 | 8/2009 | Lock et al. |
| 7,587,111 B2 | 9/2009 | de Montmorillon et al. |
| 7,599,589 B2 | 10/2009 | Overton et al. |
| 7,623,747 B2 | 11/2009 | de Montmorillon et al. |
| 7,639,915 B2 | 12/2009 | Parris et al. |
| 7,646,952 B2 | 1/2010 | Parris |
| 7,646,954 B2 | 1/2010 | Tatat |
| 7,646,955 B2 | 1/2010 | Donlagic |
| 7,665,902 B2 | 2/2010 | Griffioen et al. |
| 7,702,204 B2 | 4/2010 | Gonnet et al. |
| 7,724,998 B2 | 5/2010 | Parris et al. |
| 7,783,149 B2 | 8/2010 | Fini |
| 7,787,731 B2 | 8/2010 | Bookbinder et al. |
| 7,817,257 B2 | 10/2010 | Takenaga et al. |
| 7,817,891 B2 | 10/2010 | Lavenne et al. |
| 7,826,691 B2 | 11/2010 | Matthijsse et al. |
| 7,865,050 B1 | 1/2011 | Sun et al. |
| 7,878,712 B2 | 2/2011 | Shimotakahara et al. |
| 7,889,960 B2 | 2/2011 | de Montmorillon et al. |
| 7,903,917 B2 | 3/2011 | Bickham et al. |
| 7,903,918 B1 | 3/2011 | Bickham et al. |
| 7,970,247 B2 | 6/2011 | Barker |
| 7,974,507 B2 | 7/2011 | Lovie et al. |
| 7,995,888 B2 | 8/2011 | Gholami et al. |
| 8,009,950 B2 | 8/2011 | Molin et al. |
| 8,031,997 B2 | 10/2011 | Overton |
| 8,041,167 B2 | 10/2011 | Overton |
| 8,041,168 B2 | 10/2011 | Overton |
| 8,041,172 B2 | 10/2011 | Sillard et al. |
| 8,055,111 B2 | 11/2011 | Sillard et al. |
| 8,081,853 B2 | 12/2011 | Overton |
| 8,145,026 B2 | 3/2012 | Overton et al. |
| 8,145,027 B2 | 3/2012 | Overton et al. |
| 8,165,439 B2 | 4/2012 | Overton |
| 8,184,936 B2 | 5/2012 | Zhang et al. |
| 8,195,018 B2 | 6/2012 | Overton et al. |
| 8,259,389 B2 | 9/2012 | Pastouret et al. |
| 8,274,647 B2 | 9/2012 | Gholami et al. |
| 8,280,213 B2 | 10/2012 | Molin et al. |

(56) References Cited

U.S. PATENT DOCUMENTS

| | | |
|---|---|---|
| 8,428,411 B2 | 4/2013 | de Montmorillon et al. |
| 2002/0102082 A1 | 8/2002 | Sarchi et al. |
| 2002/0176678 A1 | 11/2002 | Mukasa |
| 2002/0197038 A1 | 12/2002 | Abbott et al. |
| 2003/0024276 A1 | 2/2003 | Anderson et al. |
| 2004/0146260 A1 | 7/2004 | Kalish et al. |
| 2004/0247269 A1 | 12/2004 | Hirano et al. |
| 2005/0008312 A1 | 1/2005 | Jang et al. |
| 2006/0039665 A1 | 2/2006 | Matsuo et al. |
| 2007/0172182 A1 | 7/2007 | Lee et al. |
| 2008/0056658 A1 | 3/2008 | Bickham et al. |
| 2008/0292262 A1 | 11/2008 | Overton et al. |
| 2009/0010596 A1 | 1/2009 | Matthijsse et al. |
| 2009/0059353 A1 | 3/2009 | Fini |
| 2009/0060437 A1 | 3/2009 | Fini et al. |
| 2009/0092365 A1 | 4/2009 | Donlagic |
| 2009/0154888 A1 | 6/2009 | Abbott, III et al. |
| 2009/0169163 A1 | 7/2009 | Abbott, III et al. |
| 2009/0175583 A1 | 7/2009 | Overton |
| 2009/0214167 A1 | 8/2009 | Lookadoo et al. |
| 2009/0279835 A1 | 11/2009 | de Montmorillon et al. |
| 2009/0297107 A1 | 12/2009 | Tatat |
| 2010/0021170 A1 | 1/2010 | Lumineau et al. |
| 2010/0028020 A1 | 2/2010 | Gholami et al. |
| 2010/0040336 A1 | 2/2010 | Chen et al. |
| 2010/0067858 A1 | 3/2010 | Kim et al. |
| 2010/0092135 A1 | 4/2010 | Barker et al. |
| 2010/0119202 A1 | 5/2010 | Overton |
| 2010/0135627 A1 | 6/2010 | Pastouret et al. |
| 2010/0142033 A1 | 6/2010 | Regnier et al. |
| 2010/0142969 A1 | 6/2010 | Gholami et al. |
| 2010/0150505 A1 | 6/2010 | Testu et al. |
| 2010/0154479 A1 | 6/2010 | Milicevic et al. |
| 2010/0166375 A1 | 7/2010 | Parris |
| 2010/0171945 A1 | 7/2010 | Gholami et al. |
| 2010/0183821 A1 | 7/2010 | Hartsuiker et al. |
| 2010/0189397 A1 | 7/2010 | Richard et al. |
| 2010/0189399 A1 | 7/2010 | Sillard et al. |
| 2010/0189400 A1 | 7/2010 | Sillard et al. |
| 2010/0202741 A1 | 8/2010 | Ryan et al. |
| 2010/0214649 A1 | 8/2010 | Burov et al. |
| 2010/0215328 A1 | 8/2010 | Tatat et al. |
| 2010/0220966 A1 | 9/2010 | Bennett |
| 2010/0254653 A1 | 10/2010 | Molin et al. |
| 2010/0303428 A1 | 12/2010 | Bickham et al. |
| 2010/0310218 A1 | 12/2010 | Molin et al. |
| 2011/0002590 A1 | 1/2011 | Ooizumi et al. |
| 2011/0026889 A1 | 2/2011 | Risch et al. |
| 2011/0037183 A1 | 2/2011 | Tudury et al. |
| 2011/0044594 A1 | 2/2011 | Tudury et al. |
| 2011/0044596 A1 | 2/2011 | Zhang et al. |
| 2011/0054861 A1 | 3/2011 | Lane |
| 2011/0054862 A1 | 3/2011 | Pimpinella et al. |
| 2011/0058781 A1 | 3/2011 | Molin et al. |
| 2011/0064367 A1 | 3/2011 | Molin et al. |
| 2011/0064371 A1 | 3/2011 | Leatherman et al. |
| 2011/0069724 A1 | 3/2011 | Richard et al. |
| 2011/0069932 A1 | 3/2011 | Overton et al. |
| 2011/0085770 A1 | 4/2011 | Bigot-Astruc et al. |
| 2011/0088433 A1 | 4/2011 | Allegretto et al. |
| 2011/0091171 A1 | 4/2011 | Tatat et al. |
| 2011/0116160 A1 | 5/2011 | Boivin et al. |
| 2011/0123161 A1 | 5/2011 | Molin et al. |
| 2011/0123162 A1 | 5/2011 | Molin et al. |
| 2011/0135262 A1 | 6/2011 | Molin et al. |
| 2011/0135263 A1 | 6/2011 | Molin et al. |
| 2011/0176782 A1 | 7/2011 | Parris |
| 2011/0188823 A1 | 8/2011 | Sillard et al. |
| 2011/0188826 A1 | 8/2011 | Sillard et al. |
| 2011/0217012 A1 | 9/2011 | Bigot-Astruc et al. |
| 2011/0229101 A1 | 9/2011 | de Montmorillon et al. |
| 2011/0268398 A1 | 11/2011 | Quinn et al. |
| 2011/0268400 A1 | 11/2011 | Lovie et al. |
| 2011/0287195 A1 | 11/2011 | Molin |
| 2011/0305423 A1 | 12/2011 | Molin et al. |
| 2012/0009358 A1 | 1/2012 | Gharbi et al. |
| 2012/0014652 A1 | 1/2012 | Parris |
| 2012/0040105 A1 | 2/2012 | Overton |
| 2012/0040184 A1 | 2/2012 | de Montmorillon et al. |
| 2012/0051703 A1 | 3/2012 | Bigot-Astruc et al. |
| 2012/0057833 A1 | 3/2012 | Tatat |
| 2012/0092651 A1 | 4/2012 | Molin et al. |
| 2012/0134376 A1 | 5/2012 | Burov et al. |
| 2012/0148206 A1 | 6/2012 | Boivin et al. |
| 2012/0195549 A1 | 8/2012 | Molin et al. |
| 2012/0195561 A1 | 8/2012 | Molin et al. |
| 2012/0213483 A1 | 8/2012 | Risch et al. |
| 2012/0224254 A1 | 9/2012 | Burov et al. |
| 2012/0243843 A1 | 9/2012 | Molin et al. |
| 2012/0251062 A1 | 10/2012 | Molin et al. |
| 2012/0275751 A1 | 11/2012 | Krabshuis et al. |
| 2012/0301093 A1 | 11/2012 | Sillard et al. |
| 2012/0315006 A1 | 12/2012 | Bigot-Astruc et al. |
| 2013/0004135 A1 | 1/2013 | Bigot-Astruc et al. |
| 2013/0028564 A1 | 1/2013 | Molin et al. |
| 2013/0071114 A1 | 3/2013 | Bickham et al. |

FOREIGN PATENT DOCUMENTS

| | | |
|---|---|---|
| EP | 1921478 A1 | 5/2008 |
| EP | 2299302 A1 | 3/2011 |
| EP | 2299303 A2 | 3/2011 |
| GB | 2100464 A | 12/1982 |
| JP | 06-216440 A | 8/1994 |
| JP | 08-304636 A | 11/1996 |
| JP | 09-048629 | 2/1997 |
| JP | 11-064665 A | 3/1999 |
| JP | 2000-347057 A2 | 12/2000 |
| JP | 2001-235648 | 8/2001 |
| JP | 2002-318315 A | 10/2002 |
| JP | 2006-047719 A | 2/2006 |
| JP | 2006-078543 A | 3/2006 |
| JP | 2006-227173 A | 8/2006 |
| JP | 2007-272239 | 10/2007 |
| WO | 00/50941 A1 | 8/2000 |
| WO | 03/081301 A1 | 10/2003 |
| WO | 2005/106544 A1 | 11/2005 |
| WO | 2006/010798 A1 | 2/2006 |
| WO | 2008/085851 A1 | 7/2008 |
| WO | 2009/062131 A1 | 5/2009 |
| WO | 2009/078962 A1 | 6/2009 |
| WO | 2010/036684 A2 | 4/2010 |
| WO | 2011/040830 A1 | 4/2011 |
| WO | 2011/109263 A1 | 9/2011 |

OTHER PUBLICATIONS

Kashima et al., "Transmission characteristics of graded-index optical fibers with a lossy outer layer," Applied Optics USA, vol. 17, No. 8, Apr. 15, 1978.

Jacomme, "Modal dispersion in multimode graded-index fibers," Applied Optics USA, vol. 14, No. 11, Nov. 1, 1975, pp. 2578-2584.

Okamoto et al., "Computer-Aided Synthesis of the Optimum Refractive-Index Profile for a Multimode Fiber," IEEE Transaction on Microwave Theory and Techniques, USA, vol. MTT-25, No. 3, Mar. 1977, pp. 1-10.

Donalagic, "Opportunities to Enhance Multimode Fiber Links by Application of Overfilled Launch," Journal of Lightwave Technology, vol. 23, No. 11, (Nov. 2005) pp. 3526-3540.

Morikuni et al., "Simulation-Based Prediction of Multimode Fiber Bandwidth for 10 Gb/s Systems," LEOS 2002, 15th Annual Meeting of IEEE Lasers & Electro-Optics Society, Glasgow, Scotland, pp. 1-2.

Guan et al., "Multimode Fibers for Compensating Intermodal Dispersion of Graded-Index Multimode Fibers", Jul. 2004, Journal of Lightwave Technology, vol. 22, No. 7, pp. 1714-1719.

Freund, et al., "High-Speed Transmission in Multimode Fibers", Journal of Lightwave Technology, vol. 28, No. 4, Feb. 15, 2010, pp. 1-18.

Kaminow et al., "Profile synthesis in multicomponent glass optical fibers", Applied Optics, vol. 16, No. 1, Jan. 1, 1977, pp. 108-112.

Molin et al., "Low Bending Sensitivity of Regular OM3/OM4 Fibers in 10GbE Applications", Optical Fiber Communication (OFC) Col-

(56) References Cited

OTHER PUBLICATIONS located National Fiber Optic Engineers Conference, 2010 Conference on (OFC/NFOEC), IEEE, Piscataway, NJ, Mar. 21, 2010, pp. 1-3.

Pepeljugoski et al., "Modeling and Simulation of Next-Generation Multimode Fiber Links", Journal of Lightwave Technology, vol. 21, No. 5, May 2003, pp. 1242-1255.

French Search Report in related French Application No. 1051489 dated Oct. 22, 2010, pp. 1-8.

Kolesar et al., "Understanding Multimode Bandwidth and Differential Mode Delay Measurements and Their Applications," Proceedings of the 51st Int'l Wire and Cable Symposium, 2002, pp. 453-460.

Coleman, et al., "Calculated EMB Enhances 10GbE Performance Reliability for Laser-Optimized 50/125 μm Multimode Fiber," Corning Cable Systems Whitepaper (Mar. 2005).

Gloge et al., "Multimode Theory of Graded-Core Fibers" Bell system Technical Journal 1973, pp. 1563-1578.

Yabre, "Comprehensive Theory of Dispersion in Graded-Index Optical Fibers" Journal of Lightwave Technology, Feb. 2000, vol. 18, No. 2, pp. 166-177.

French Search Report and Written Opinion in related French Application No. 0904305 dated Apr. 14, 2010, pp. 1-7.

European Search Report and Written Opinion in related European Application No. 10175717 dated Nov. 22, 2010, pp. 1-6.

French Search Report in related French Application No. 0958382 dated Jun. 9, 2010, pp. 1-6.

European Search Report in related European Application No. 10192263 dated Mar. 1, 2011, pp. 1-5.

European Patent Office Intention to Grant in related European Application No. 10192263.1 dated Sep. 10, 2012, pp. 1-6.

French Search Report in related French Application No. 0958381 dated Jun. 9, 2010, pp. 1-5.

European Search Report in related European Application No. 10192225 dated Mar. 1, 2011, pp. 1-4.

European Patent Office Intention to Grant in related European Application No. 10192225.0 dated Jul. 9, 2012, pp. 1-7.

French Search Report in related French Application No. 0958637 dated Jun. 17, 2010, pp. 1-6.

European Search Report in related European Application No. 10193134 dated Apr. 4, 2011, pp. 1-5.

French Search Report in related French Application No. 0958639 dated Jun. 17, 2010, pp. 1-6.

European Search Report in related European Application No. 10193147 dated Apr. 4, 2011, pp. 1-6.

TRENCH-ASSISTED MULTIMODE OPTICAL FIBER

CROSS-REFERENCE TO PRIORITY APPLICATIONS

This application hereby claims the benefit of U.S. Patent Application No. 61/539,346 for a Trench-Assisted Multimode Optical Fiber (filed Sep. 26, 2011), which is hereby incorporated by reference in its entirety.

This application is continuation-in-part of U.S. patent application Ser. No. 12/878,449 (Molin et al.) for a Multimode Optical Fiber Having Improved Bending Losses (filed Sep. 9, 2010, and published Mar. 10, 2011, as U.S. Patent Publication No. US2011/0058781 A1), which itself claims the benefit of U.S. Patent Application No. 61/241,592 for a Fibre Optique Multimode Présentant des Pertes en Courbure Améliorées (filed Sep. 11, 2009) and French application Ser. No. 09/04305 for a Fibre Optique Multimode Présentant des Pertes en Courbure Améliorées (filed Sep. 9, 2009, at the National Institute of Industrial Property (France)). French application Ser. No. 09/04305, U.S. Patent Application No. 61/241,592, U.S. patent application Ser. No. 12/878,449, and U.S. Patent Publication No. US2011/0058781 A1 are hereby incorporated by reference in their entirety.

This application is continuation-in-part of U.S. patent application Ser. No. 12/953,948 (Molin et al.) for a High-Bandwidth, Multimode Optical Fiber with Reduced Cladding Effect (filed Nov. 24, 2010, and published May 26, 2011, as U.S. Patent Publication No. US2011/0123161 A1), which itself claims the benefit of U.S. Patent Application No. 61/265,101 for a Fibre Optique Multimode à Très Large Bande Passante avec une Interface Cœur-Gaine Optimiséé (filed Nov. 30, 2009) and French application Ser. No. 09/58381 for a Fibre Optique Multimode à Très Large Bande Passante avec une Interface Cœur-Gaine Optimiséé (filed Nov. 25, 2009, at the National Institute of Industrial Property (France)). French application Ser. No. 09/58381, U.S. Patent Application No. 61/265,101, U.S. patent application Ser. No. 12/953,948, and U.S. Patent Publication No. US2011/0123161 A1 are hereby incorporated by reference in their entirety.

This application is continuation-in-part of U.S. patent application Ser. No. 12/954,036 (Molin et al.) for a High-Bandwidth, Dual-Trench-Assisted Multimode Optical Fiber (filed Nov. 24, 2010, and published May 26, 2011, as U.S. Patent Publication No. US2011/0123162 A1), which itself claims the benefit of U.S. Patent Application No. 61/265,115 for a Fibre Optique Multimode à Très Large Bande Passante avec une Interface Cœur-Gaine Optimiséé (filed Nov. 30, 2009) and French application Ser. No. 09/58382 for a Fibre Optique Multimode à Très Large Bande Passante avec une Interface Cœur-Gaine Optimiséé (filed Nov. 25, 2009, at the National Institute of Industrial Property (France)). French application Ser. No. 09/58382, U.S. Patent Application No. 61/265,115, U.S. patent application Ser. No. 12/954,036, and U.S. Patent Publication No. US2011/0123162 A1 are hereby incorporated by reference in their entirety.

This application is continuation-in-part of U.S. patent application Ser. No. 12/959,688 (Molin et al.) for a Multimode Optical Fiber with Low Bending Losses and Reduced Cladding Effect (filed Dec. 3, 2010, and published Jun. 9, 2011, as U.S. Patent Publication No. US2011/0135262 A1), which itself claims the benefit of U.S. Patent Application No. 61/266,746 for a Fibre Optique Multimode à Large Bande Passante et à Faibles Pertes par Courbure (filed Dec. 4, 2009) and French application Ser. No. 09/58637 for a Fibre Optique Multimode à Large Bande Passante et à Faibles Pertes par Courbure (filed Dec. 3, 2009, at the National Institute of Industrial Property (France)). French application Ser. No. 09/58637, U.S. Patent Application No. 61/266,746, U.S. patent application Ser. No. 12/959,688, and U.S. Patent Publication No. US2011/0135262 A1 are hereby incorporated by reference in their entirety.

This application is continuation-in-part of U.S. patent application Ser. No. 12/959,866 (Molin et al.) for a High-Bandwidth Multimode Optical Fiber Having Reduced Bending Losses (filed Dec. 3, 2010, and published Jun. 9, 2011, as U.S. Patent Publication No. US2011/0135263 A1), which itself claims the benefit of U.S. Patent Application No. 61/266,754 for a Fibre Optique Multimode à Large Bande Passante et à Faibles Pertes par Courbure (filed Dec. 4, 2009) and French application Ser. No. 09/58639 for a Fibre Optique Multimode à Large Bande Passante et à Faibles Pertes par Courbure (filed Dec. 3, 2009, at the National Institute of Industrial Property (France)). French application Ser. No. 09/58639, U.S. Patent Application No. 61/266,754, U.S. patent application Ser. No. 12/959,866, and U.S. Patent Publication No. US2011/0135263 A1 are hereby incorporated by reference in their entirety.

This application is continuation-in-part of U.S. patent application Ser. No. 13/037,943 (Molin et al.) for a Broad-Bandwidth Multimode Optical Fiber Having Reduced Bending Losses (filed Mar. 1, 2011, and published Sep. 8, 2011, as U.S. Patent Publication No. US2011/0217012 A1), which itself claims the benefit of U.S. Patent Application No. 61/323,619 for a Fibre Optique Multimode à Large Bande Passante et à Faibles Pertes par Courbure (filed Apr. 13, 2010) and French application Ser. No. 10/51489 for a Fibre Optique Multimode à Large Bande Passante et à Faibles Pertes par Courbure (filed Mar. 2, 2010, at the National Institute of Industrial Property (France)). French application Ser. No. 10/51489, U.S. Patent Application No. 61/323,619, U.S. patent application Ser. No. 13/037,943, and U.S. Patent Publication No. US2011/0217012 A1 are hereby incorporated by reference in their entirety.

FIELD OF THE INVENTIONS

The present invention relates to the field of fiber optic transmission and, more specifically, to a trench-assisted multimode optical fiber having reduced bending losses and a high bandwidth for high-data-rate applications.

BACKGROUND

An optical fiber (i.e., a glass fiber typically surrounded by one or more coating layers) conventionally includes an optical fiber core, which transmits and/or amplifies an optical signal, and an optical cladding, which confines the optical signal within the core. Accordingly, the refractive index of the core $n_c$ is typically greater than the refractive index of the optical cladding $n_g$ (i.e., $n_c > n_g$).

For optical fibers, the refractive index profile is generally classified according to the graphical appearance of the function that associates the refractive index with the radius of the optical fiber. Conventionally, the distance r to the center of the optical fiber is shown on the x-axis, and the difference between the refractive index (at radius r) and the refractive index of the optical fiber's outer cladding (e.g., an outer optical cladding) is shown on the y-axis. The refractive index profile is referred to as a "step" profile, a "trapezoidal" profile, a "parabolic" profile (e.g., an "alpha" profile), or a "triangular" profile for graphs having the respective shapes of a step, a trapezoid, a parabola, or a triangle. These curves are generally representative of the optical fiber's theoretical or set profile. Constraints in the manufacture of the optical fiber, however, may result in a slightly different actual profile.

Generally speaking, two main categories of optical fibers exist: multimode fibers and single-mode fibers. In a multimode optical fiber, for a given wavelength, several optical modes are propagated simultaneously along the optical fiber. In a single-mode optical fiber, the signal propagates in a fundamental LP01 mode that is guided in the optical-fiber core, while the higher order modes (e.g., the LP11 mode) are strongly attenuated. The typical diameter of a single-mode or multimode glass fiber is 125 microns. The core of a multimode optical fiber typically has a diameter of between about 50 microns and 62.5 microns, whereas the core of a single-mode optical fiber typically has a diameter of between about 6 microns and 9 microns. Multimode systems are generally less expensive than single-mode systems, because multimode light sources, connectors, and maintenance can be obtained at a lower cost.

Multimode optical fibers are commonly used for short-distance applications requiring a broad bandwidth, such as local networks or LAN (local area network). Multimode optical fibers have been the subject of international standardization under the ITU-T G.651.1 recommendations, which, in particular, define criteria (e.g., bandwidth, numerical aperture, and core diameter) that relate to the requirements for optical fiber compatibility. The ITU-T G.651.1 standard (July 2007) is hereby incorporated by reference in its entirety.

In addition, the OM3 standard has been adopted to meet the demands of high-bandwidth applications (i.e., a data rate higher than 1 GbE) over long distances (i.e., distances greater than 300 meters). The OM3 standard is hereby incorporated by reference in its entirety. With the development of high-bandwidth applications, the average core diameter for multimode optical fibers has been reduced from 62.5 microns to 50 microns.

Typically, an optical fiber should have the broadest possible bandwidth to perform well in a high-bandwidth application. For a given wavelength, the bandwidth of an optical fiber may be characterized in several different ways. Typically, a distinction is made between the so-called "overfilled launch" condition (OFL) bandwidth and the so-called "effective modal bandwidth" condition (EMB). The acquisition of the OFL bandwidth assumes the use of a light source exhibiting uniform excitation over the entire radial surface of the optical fiber (e.g., using a laser diode or light emitting diode (LED)).

Recently developed light sources used in high-bandwidth applications, such as VCSELs (Vertical-Cavity Surface-Emitting Lasers), exhibit an inhomogeneous excitation over the radial surface of the optical fiber. For this kind of light source, the OFL bandwidth is a less suitable measurement, and so it is preferable to use the effective modal bandwidth (EMB). The calculated effective bandwidth (EMBc) estimates the minimum EMB of a multimode optical fiber independent of the kind of VCSEL used. The EMBc is obtained from a differential-mode-delay (DMD) measurement (e.g., as set forth in the FOTP-220 standard).

An exemplary method of measuring DMD and calculating the effective modal bandwidth can be found in the FOTP-220 standard, which is hereby incorporated by reference in its entirety. Further details on this technique are set forth in the following publications, each of which is hereby incorporated by reference: P. F. Kolesar and D. J. Mazzarese, "*Understanding Multimode Bandwidth and Differential Mode Delay Measurements and Their Applications*," Proceedings of the 51st Int'l Wire and Cable Symposium, 2002, pp. 453-460; and Doug Coleman and Phillip Bell, "*Calculated EMB Enhances 10 GbE Performance Reliability for Laser-Optimized 50/125 µm Multimode Fiber*," Corning Cable Systems Whitepaper (March 2005).

FIG. 1 shows a schematic diagram of a DMD measurement according to the criteria of the FOTP-220 standard as published in its TIA SCFO-6.6 version of Nov. 22, 2002. FIG. 1 schematically represents a part of an optical fiber (i.e., an optical core surrounded by an outer cladding). A DMD graph is obtained by successively injecting into the multimode optical fiber a light pulse having a given wavelength $\lambda_0$ with a radial offset between each successive pulse. The delay of each pulse is then measured after a given length of fiber L. Multiple identical light pulses (i.e., light pulses having the same amplitude, wavelength, and frequency) are injected with different radial offsets with respect to the center of the multimode optical fiber's core. The injected light pulse is depicted in FIG. 1 as a black dot on the optical core of the optical fiber. In order to characterize an optical fiber with a 50-micron diameter, the FOTP-220 standard recommends that individual measurements be carried out at radial offset intervals of about two microns or less. From these measurements, it is possible to determine the modal dispersion and the calculated effective modal bandwidth (EMBc).

The TIA-492AAAC-A standard, which is hereby incorporated by reference in its entirety, specifies the performance requirements for 50-micron-diameter multimode optical fibers used over long distances in Ethernet high-bandwidth transmission network applications. The OM3 standard requires, at a wavelength of 850 nanometers, an EMB of at least 2,000 MHz·km. The OM3 standard assures error-free transmissions for a data rate of 10 Gb/s (10 GbE) up to a distance of 300 meters. The OM4 standard requires, at a wavelength of 850 nanometers, an EMB of at least 4,700 MHz·km to obtain error-free transmissions for a data rate of 10 Gb/s (10 GbE) up to a distance of 400 meters. The OM4 standard is hereby incorporated by reference in its entirety.

In a multimode optical fiber, the difference between the propagation times, or group delay times, of the several modes along the optical fiber determine the bandwidth of the optical fiber. In particular, for the same propagation medium (i.e., a step-index multimode optical fiber), the different modes have different group delay times. This difference in group delay times results in a time lag between the pulses propagating along different radial offsets of the optical fiber.

For example, as shown in the graph on the right side of FIG. 1, a time lag is observed between the individual pulses. This FIG. 1 graph depicts each individual pulse in accordance with its radial offset in microns (y-axis) and the time in nanoseconds (x-axis) the pulse took to pass along a given length of the optical fiber.

As depicted in FIG. 1, the location of the peaks along the x-axis varies, which indicates a time lag (i.e., a delay) between the individual pulses. This delay causes a broadening of the resulting light pulse. Broadening of the light pulse increases the risk of the pulse being superimposed onto a trailing pulse, which reduces the bandwidth (i.e., data rate) supported by the optical fiber. The bandwidth, therefore, is linked to the group delay time of the optical modes propagating in the multimode core of the optical fiber. Thus, to guarantee a broad bandwidth, it is desirable for the group delay times of all the modes to be identical. Stated differently, the intermodal dispersion should be zero, or at least minimized, for a given wavelength.

To reduce intermodal dispersion, the multimode optical fibers used in telecommunications generally have a core with a refractive index that decreases progressively from the center of the optical fiber to its interface with a cladding (i.e., an "alpha" core profile). Such an optical fiber has been used for a number of years, and its characteristics have been described in "*Multimode Theory of Graded-Core Fibers*" by D. Gloge et al., Bell system Technical Journal 1973, pp. 1563-1578, and summarized in "*Comprehensive Theory of Dispersion in Graded-Index Optical Fibers*" by G. Yabre, Journal of Lightwave Technology, February 2000, Vol. 18, No. 2, pp. 166-177. Each of the above-referenced articles is hereby incorporated by reference in its entirety.

A graded-index profile (i.e., an alpha-index profile) can be described by a relationship between the refractive index value n and the distance r from the center of the optical fiber according to the following equation:

$$n = n_1 \sqrt{1 - 2\Delta\left(\frac{r}{a}\right)^\alpha}$$

wherein, $\alpha \geq 1$, and $\alpha$ is a non-dimensional parameter that is indicative of the shape of the index profile;

$n_1$ is the maximum refractive index of the optical fiber's core;

a is the radius of the optical fiber's core; and $$\Delta = \frac{(n_1^2 - n_0^2)}{2n_1^2}$$

where $n_0$ is the minimum refractive index of the multimode core, which may correspond to the refractive index of the outer cladding (most often made of silica).

A multimode optical fiber with a graded index (i.e., an alpha profile) therefore has a core profile with a rotational symmetry such that along any radial direction of the optical fiber the value of the refractive index decreases continuously from the center of the optical fiber's core to its periphery. When a multimode light signal propagates in such a graded-index core, the different optical modes experience differing propagation mediums (i.e., because of the varying refractive indices). This, in turn, affects the propagation speed of each optical mode differently. Thus, by adjusting the value of the parameter $\alpha$, it is possible to obtain a group delay time that is nearly equal for all of the modes. Stated differently, the refractive index profile can be modified to reduce or even eliminate intermodal dispersion.

In practice, however, a manufactured multimode optical fiber has a graded-index central core surrounded by an outer cladding of constant refractive index. The core-cladding interface interrupts the core's alpha-index profile. Consequently, the multimode optical fiber's core never corresponds to a theoretically perfect alpha profile (i.e., the alpha set profile). The outer cladding accelerates the higher-order modes with respect to the lower-order modes. This phenomenon is known as the "cladding effect." In DMD measurements, the responses acquired for the highest radial positions (i.e., nearest the outer cladding) exhibit multiple pulses, which results in a temporal spreading of the response signal. Therefore, bandwidth is diminished by this cladding effect.

Multimode optical fibers are commonly used for short-distance applications requiring a high bandwidth, such as local area networks (LANs). In such applications, the optical fibers may be subjected to accidental or otherwise unintended bending, which can give rise to signal attenuation and modify the mode power distribution and the bandwidth of the optical fiber.

It is therefore desirable to achieve multimode optical fibers that are unaffected by bends having a radius of curvature of less than 10 millimeters. One proposed solution involves adding a depressed trench between the core and the cladding. Nevertheless, the position and the depth of the trench can significantly affect the optical fiber's bandwidth.

Therefore, a need exists for a multimode optical fiber having reduced bending losses and a high bandwidth.

SUMMARY

In one aspect, the present invention embraces a multimode optical fiber that, for a length of 300 meters at a wavelength between about 840 nanometers and 860 nanometers, the multimode optical fiber exhibits a leaky-mode bandwidth ($EMB_{leaky}$) of about 1,850 MHz-km or greater.

In another aspect, the present invention embraces a multimode optical fiber that, for a length of 400 meters at a wavelength between about 840 nanometers and 860 nanometers, the multimode optical fiber exhibits a leaky-mode bandwidth ($EMB_{leaky}$) of about 2,550 MHz-km or greater (e.g., at least about 3,880 MHz-km).

In this regard, one exemplary multimode optical fiber satisfying one or both of these leaky-mode-bandwidth criteria includes a central core surrounded by an outer cladding. The central core has an outer radius $r_1$ and an alpha-index profile with respect to the outer cladding. An inner cladding is positioned between the central core and the outer cladding (e.g., immediately surrounding the central core). The inner cladding has (i) an outer radius $r_2$, (ii) a width $w_2$, and (iii) a refractive index difference $\Delta n_2$ with respect to the outer cladding. A depressed trench is positioned between the inner cladding and the outer cladding (e.g., immediately surrounding the inner cladding). The depressed trench has (i) an outer radius $r_t$, (ii) a width $w_t$, and (iii) a refractive index difference $\Delta n_t$ with respect to the outer cladding.

In one exemplary embodiment, for two turns around a bend radius of 5 millimeters at a wavelength of 850 nanometers, the multimode optical fiber has bending losses of less than about 1 dB (e.g., less than about 0.3 dB).

In another exemplary embodiment, for two turns around a bend radius of 7.5 millimeters at a wavelength of 850 nanometers, the multimode optical fiber has bending losses of less than about 0.4 dB (e.g., less than about 0.2 dB).

In yet another exemplary embodiment, for two turns around a bend radius of 10 millimeters at a wavelength of 850 nanometers, the multimode optical fiber has bending losses of less than about 0.3 dB (e.g., less than about 0.1 dB).

In yet another exemplary embodiment, for two turns around a bend radius of 15 millimeters at a wavelength of 850 nanometers, the multimode optical fiber has bending losses of less than about 0.1 dB (e.g., less than about 0.05 dB).

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces a multimode optical fiber that achieves reduced bending losses and a high bandwidth.

Figure 1:
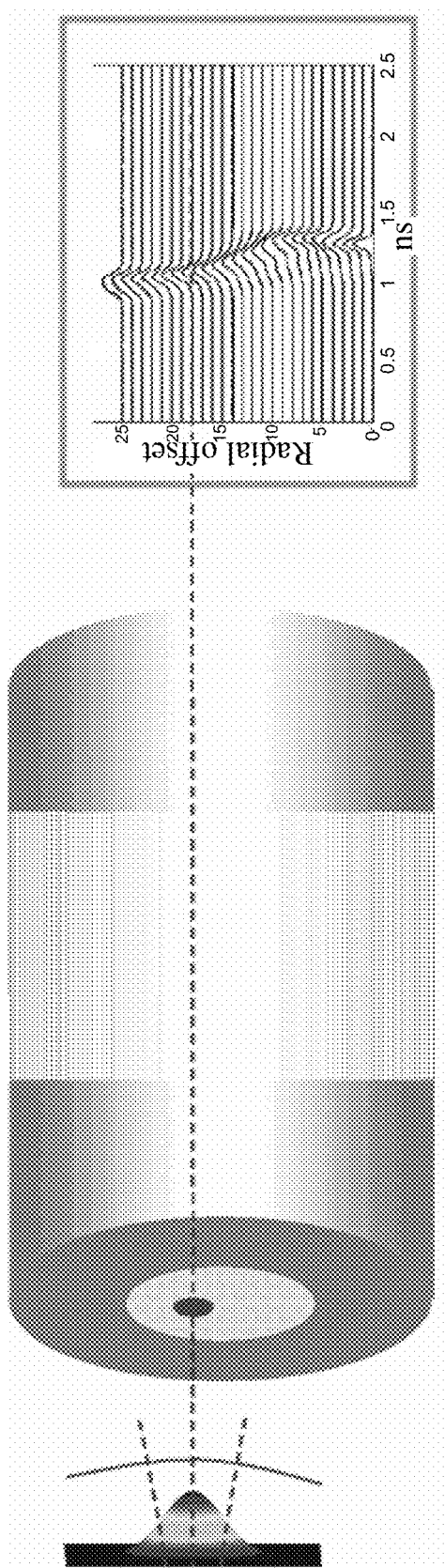
FIG. 1 schematically depicts an exemplary DMD measurement method and graph.
Figure 2:
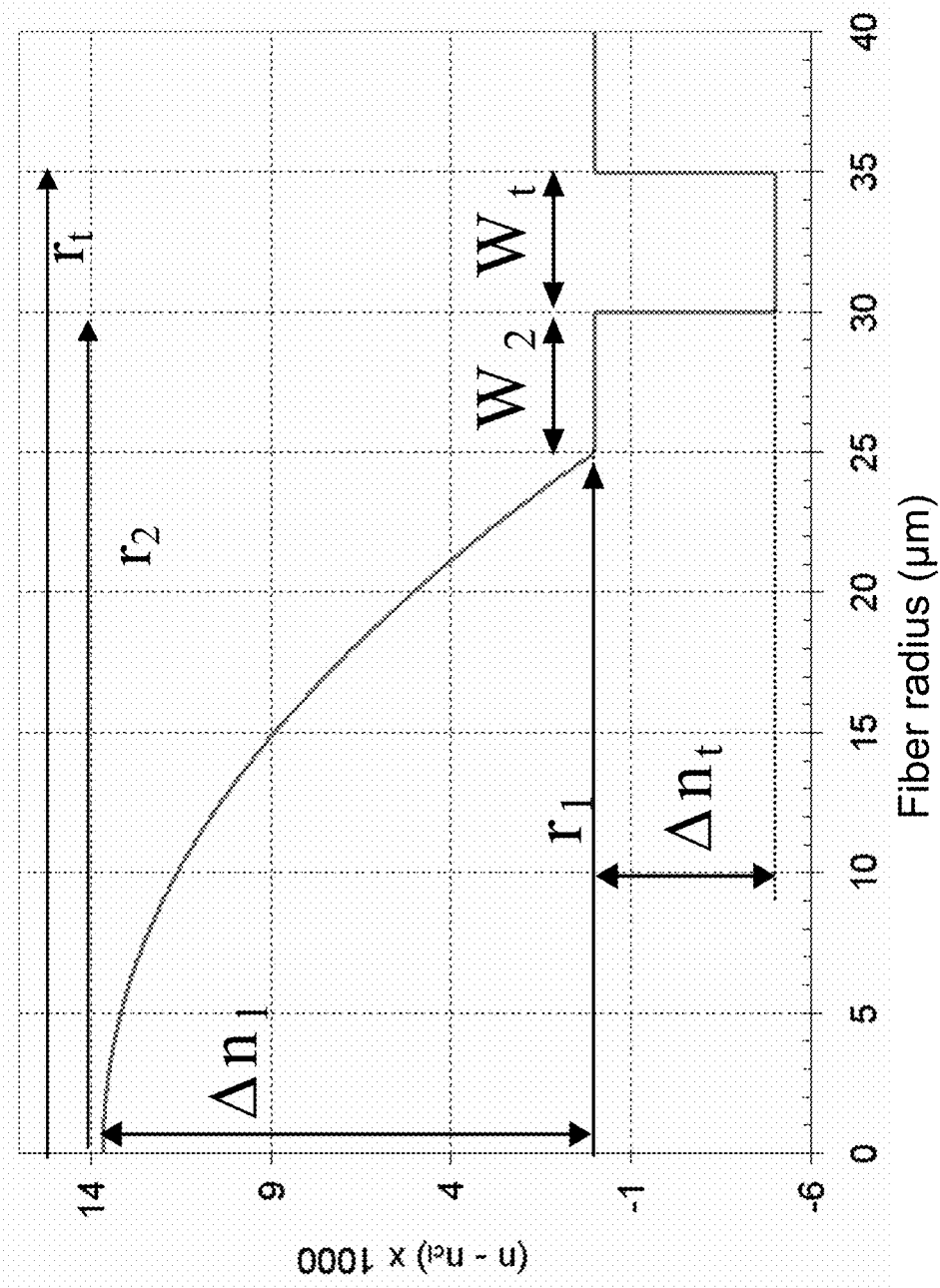
FIG. 2 graphically depicts the refractive index profile of an exemplary optical fiber according to the present invention.

FIG. 2 depicts the refractive index profile of an exemplary optical fiber in accordance with the present invention as disclosed in parent U.S. patent application Ser. No. 12/953,948, now published as U.S. Patent Publication No. US2011/0123161 A1.

The exemplary optical fiber depicted in FIG. 2 includes a central core having an outer radius $r_1$ and an alpha refractive index profile (i.e., an alpha-index profile) with respect to an outer cladding (e.g., an outer optical cladding) surrounding the central core. Typically, the core has an outer radius $r_1$ of about 25 microns (e.g., ±1.5 microns). The refractive index difference between the central core and the outer cladding typically has a maximum value $\Delta n_1$ of between about $11 \times 10^{-3}$ and $16 \times 10^{-3}$ (e.g., between about $12 \times 10^{-3}$ and $15 \times 10^{-3}$), such as a maximum refractive index difference $\Delta n_1$ of about 1% (i.e., $14.5 \times 10^{-3}$). The central core typically has an alpha profile with an alpha parameter of between about 1.9 and 2.1. In a particular embodiment, the central core has an alpha profile with an alpha parameter of between about 2.04 and 2.10, such as between about 2.06 and 2.09 (e.g., between about 2.07 and 2.08). In another particular embodiment, the central core has an alpha profile with an alpha parameter of between about 2.05 and 2.08 (e.g., between about 2.06 and 2.07).

For reasons of cost, the outer cladding (i.e., the outer optical cladding) is typically made of natural silica, but it may alternatively be made of doped silica.

The exemplary optical fiber depicted in FIG. 2 includes an inner cladding positioned between the central core and the outer cladding. In one embodiment, the inner cladding immediately surrounds the central core. The inner cladding has an outer radius $r_2$, a width $w_2$, and a refractive index difference $\Delta n_2$ with respect to the outer cladding. The refractive index difference $\Delta n_2$ between the inner cladding and the outer cladding is typically between about $-1.0 \times 10^{-3}$ and $1.0 \times 10^{-3}$ (e.g., between about $-0.5 \times 10^{-3}$ and $0.5 \times 10^{-3}$), more typically between about $-0.2 \times 10^{-3}$ and $0.2 \times 10^{-3}$ (e.g., between about $-0.05 \times 10^{-3}$ and $0.05 \times 10^{-3}$). More typically, and as illustrated in FIG. 2, the refractive index difference $\Delta n_2$ between the inner cladding and the outer cladding is approximately zero. The inner cladding's width $w_2$ is typically less than 5 microns, more typically less than 3 microns (e.g., between about 1 micron and 2 microns, such as 1.5 microns). The characteristics of the inner cladding facilitate the achievement of high bandwidths.

The exemplary optical fiber depicted in FIG. 2 includes a depressed trench positioned between the inner cladding and the outer cladding. By way of example, the depressed trench may immediately surround the inner cladding. The depressed trench has an outer radius $r_t$, a width $w_t$, and a refractive index difference $\Delta n_t$ with respect to the outer cladding. The width $w_t$ of the depressed trench is typically between about 3 and 5 microns (μm) (e.g., about 4 microns).

Typically, the term "depressed trench" is used to describe a radial portion of an optical fiber that has a refractive index that is substantially less than the refractive index of the outer cladding. In this regard, the refractive index difference $\Delta n_t$ between the depressed trench and the outer cladding is typically between about $-15 \times 10^{-3}$ and $-3 \times 10^{-3}$, more typically between about $-10 \times 10^{-3}$ and $-5 \times 10^{-3}$ (e.g., about $-6 \times 10^{-3}$).

Generally speaking, a refractive index difference with respect to the outer cladding can be expressed as a percentage using the following equation:

$$\Delta \%(r) = \frac{100 \times (n(r)^2 - n_{cladding}^2)}{2n(r)^2}$$

where n(r) is the comparative refractive index value as a function of radial position (e.g., the refractive index $n_t$ of the depressed trench), and $n_{cladding}$ is the refractive index value of the outer cladding. Those of ordinary skill in the art will appreciate that this equation can be used if the refractive index varies over a given section of the optical fiber (i.e., the refractive index value varies as a function of radial position) or if the refractive index is constant over a given section of the optical fiber.

Those of ordinary skill in the art will appreciate that the outer cladding typically has a constant refractive index. That said, if the outer cladding has a non-constant refractive index, the refractive index difference (e.g., $\Delta n_1$, $\Delta n_2$, $\Delta n_t$, $\Delta_1\%$, $\Delta_2\%$, or $\Delta_t\%$) between a section of the optical fiber and the outer cladding is measured using the refractive index of the inner most portion of the outer cladding (i.e., the portion of the outer cladding that is expected to most strongly affect the propagation of optical signals within the optical fiber).

A constant refractive index difference with respect to the outer cladding can also be expressed as a percentage by the following equation:

$$\Delta\% = \frac{100 \times (n^2 - n_{cladding}^2)}{2n^2}$$

where n is the comparative refractive index (e.g., the refractive index $n_t$ of the depressed trench), and $n_{cladding}$ is the refractive index of the outer cladding.

Parent U.S. patent application Ser. No. 12/953,948, now published as U.S. Patent Publication No. US2011/0123161 A1, discloses that the refractive index difference $\Delta n_t$ between the depressed trench and the outer cladding and the width $w_t$ of the depressed trench should be high enough to facilitate low bending losses.

As disclosed in parent U.S. patent application Ser. No. 12/953,948, now published as U.S. Patent Publication No. US2011/0123161 A1, a depressed trench's volume $v_t$ may be defined by the following equation:

$$v_t = 2\pi \times \int_{r_{int}}^{r_t} \Delta_t\%(r) \times r \times dr$$

in which $\Delta_t\%$ (r) is the depressed trench's refractive index difference as a function of radial position with respect to the outer cladding expressed in percentage, $r_t$ is the outer radius of the depressed trench, and $r_{int}$ is the inner radius of the depressed trench (e.g., the outer radius $r_2$ of the inner cladding). Those of ordinary skill in the art will appreciate that this equation can be used if the depressed trench's refractive index difference varies (i.e., the trench is non-rectangular) or if the refractive index difference is constant (i.e., the depressed trench is rectangular).

If the refractive index difference between the depressed trench and the outer cladding is constant, the volume $v_t$ of the depressed trench can also be defined by the following simplified equation:

$$v_t = \Delta_t\% \cdot \pi \cdot (r_t^2 - r_{int}^2)$$

in which $\Delta_t\%$ is the depressed trench's refractive index difference with respect to the outer cladding expressed in percentage, $r_t$ is the outer radius of the depressed trench, and $r_{int}$ is the inner radius of the depressed trench (e.g., the outer radius $r_2$ of the inner cladding).

For some embodiments of the exemplary optical fiber depicted in FIG. 2, the volume $v_t$ of the depressed trench is typically between about 200%·μm² and 1,200%·μm². More typically, the volume $v_t$ of the depressed trench is between about 250%·μm² and 750%·μm². The characteristics of the depressed trench facilitate the achievement of low bending losses.

Those having ordinary skill in the art will appreciate that the foregoing inclusion of a constant (e.g., pi) is not crucial to characterizing the size of a depressed trench. Parent U.S. patent application Ser. No. 12/878,449, now published as U.S. Patent Publication No. US2011/0058781 A1, discloses characterizing depressed-trench volume with respect to the trench's width $W_t$ and refractive index difference $\Delta n_t$ with the outer optical cladding, namely $V=1000\times w_t \cdot \Delta n_t$. Parent U.S. patent application Ser. No. 12/878,449 schematically depicts refractive index profiles of two multimode optical fibers having (i) a central core with an outer radius $r_1$ and an alpha index profile with respect to the outer optical cladding and (ii) a depressed trench having a constant width $W_t$ (i.e., a rectangular, step refractive index profile) and a refractive index difference $\Delta n_t$ with the outer optical cladding. Parent U.S. patent application Ser. No. 12/878,449 also discloses an exemplary depressed trench volume of less than about −40 microns (e.g., between about −20 microns and −40 microns), typically between about −30 microns and −40 microns, as defined by the equation $V=1000\times W_t \times \Delta n_t$.

As further disclosed in parent U.S. patent application Ser. No. 12/953,948, now published as U.S. Patent Publication No. US2011/0123161 A1, the relation between the width $w_2$ of the inner cladding and the refractive index difference $\Delta n_t$ of the depressed trench makes it possible to achieve both low bending losses and a high bandwidth.

For example, at a wavelength of 850 nanometers, optical fibers in accordance with the present invention typically have: (i) for two turns with a bend radius (e.g., a radius of curvature) of 15 millimeters, bending losses of less than about 0.1 dB (e.g., less than about 0.05 dB), (ii) for two turns with a bend radius of 10 millimeters, bending losses of less than about 0.3 dB (e.g., less than about 0.1 dB), (iii) for two turns with a bend radius of 7.5 millimeters, bending losses of less than about 0.4 dB (e.g., less than about 0.2 dB), and (iv) for two turns with a bend radius of 5 millimeters, bending losses of less than about 1 dB (e.g., less than about 0.3 dB).

Figure 3:
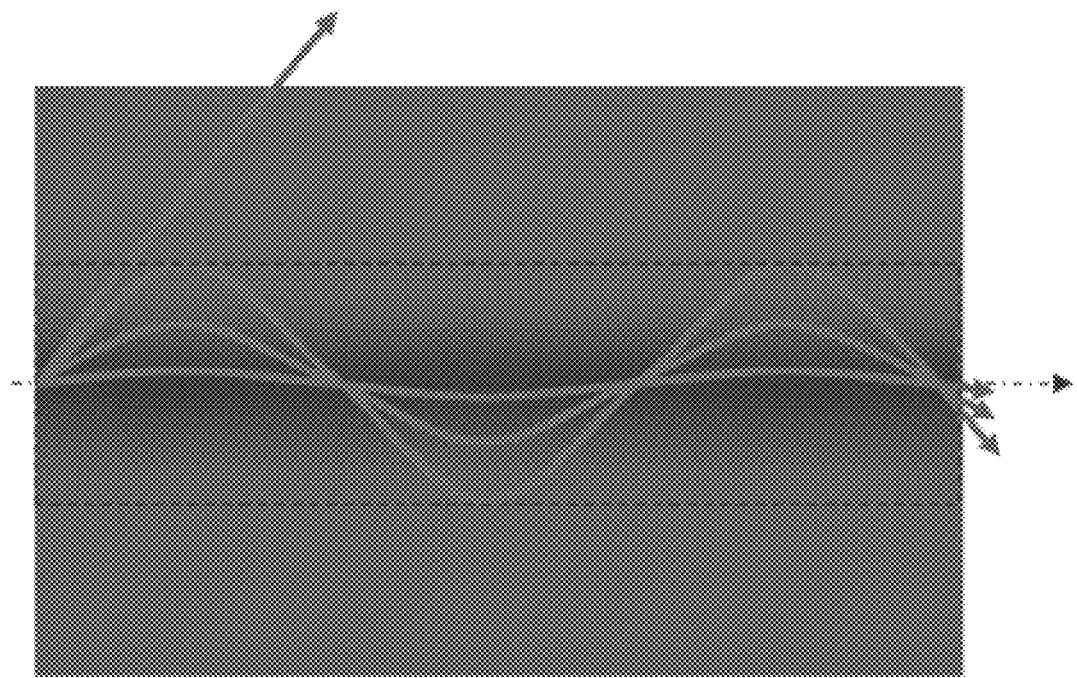
FIG. 3 schematically depicts optical-ray propagation in a conventional multimode fiber with a graded-index core.
Figure 4:
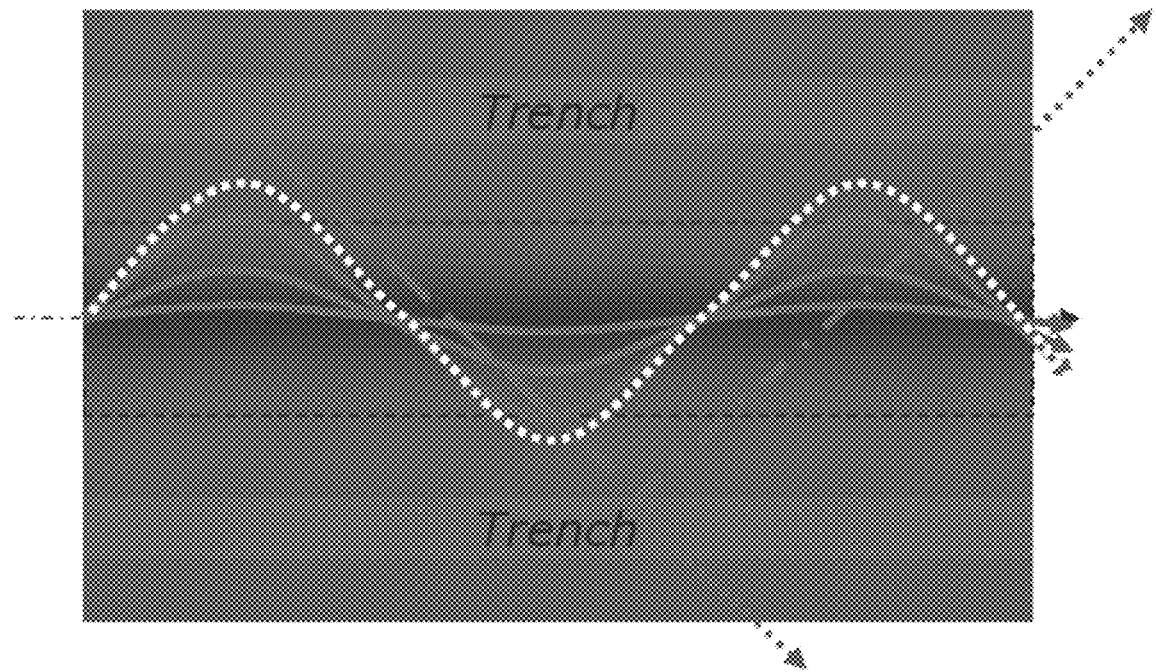
FIG. 4 schematically depicts optical-ray propagation in a trench-assisted multimode fiber with a graded-index core.

Conventionally, guided light rays are guided by total internal reflection within a multimode optical fiber. See FIG. 3. For multimode optical fibers that include a depressed trench, however, the most angled light rays, which are not reflected and thus lost in conventional optical fibers, are reflected back to the core at the interface of the inner cladding and the trench. This reflection is not total (i.e., partial reflection) because of the finite trench width. As a consequence, the most angled light rays lose energy (i.e., leak out reflection after reflection) during their propagation along the optical fiber. See FIG. 4. The leakage losses of these leaky light rays (and thus of the leaky modes) depend on the radial width of the depressed trench. Wider depressed trenches reduce the leakage losses of the leaky modes. In practice, however, the depressed trench has a finite width, barring total internal reflection and thereby resulting in some leakage losses.

Nevertheless, leaky modes, like guided modes, are eigenmodes of the waveguide. The leaky modes experience effective refractive indices $n_{eff}$ that are complex. In this regard, analysis of the imaginary part of the effective refractive indices $n_{eff}$ provides information regarding their leakage losses. For example, at a given wavelength $\lambda$, the leakage losses $L_{leaky}$ of the leaky modes (dB/m) may be determined using the following equation:

$$L_{leaky} = \frac{20}{\ln(10)} \cdot \frac{2\pi}{\lambda} \text{Im}(n_{eff}).$$

Figure 5:
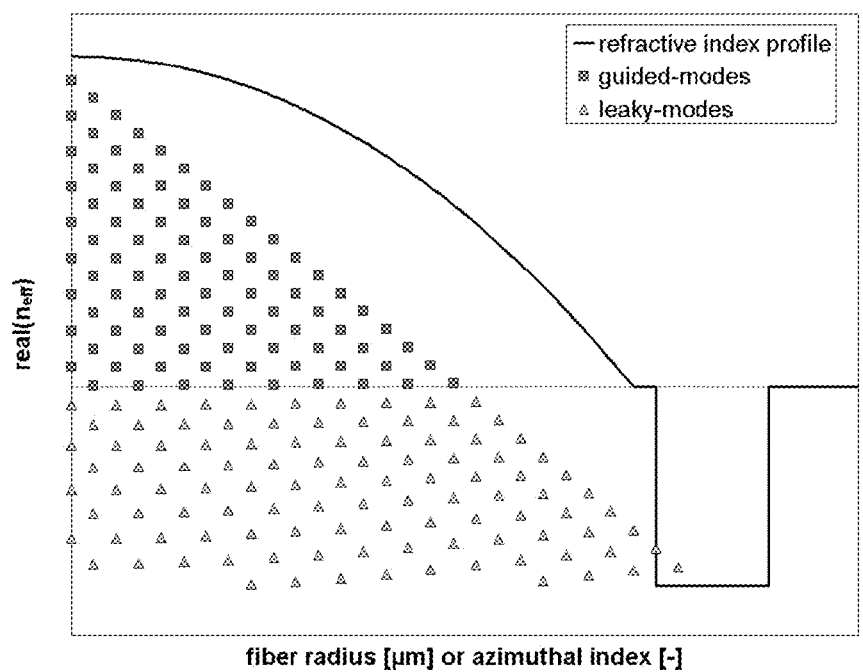
FIG. 5 schematically depicts the refractive index profile of an exemplary optical fiber and the modes propagating in the optical fiber.

FIG. 5 schematically depicts the refractive index profile of an exemplary multimode optical fiber and the modes propagating in the optical fiber. Additional propagation modes (i.e., leaky modes) are observed below the baseline, zero value of the relative effective refractive index $n_{\mathit{eff}}$ (i.e., with respect to the refractive index of the outer optical cladding). The real parts of the leaky modes' effective refractive indices (i.e., real ($n_{\mathit{eff}}$)) are (i) lower than those of the guided modes and (ii) lower than the refractive index of the outer cladding.

Figure 6:
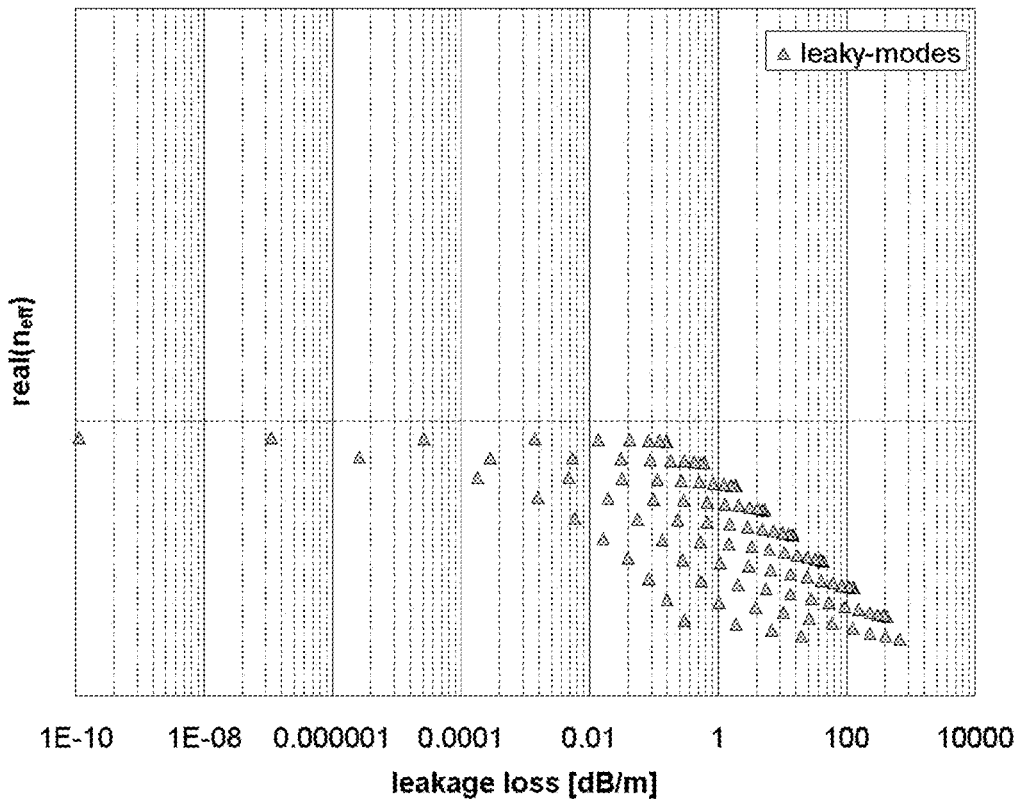
FIG. 6 graphically depicts the real relative effective refractive indices of the modes as a function of the leakage losses of the leaky modes in the optical fiber of FIG. 5.

FIG. 6 shows the relationship between the real part of the relative effective refractive indices $n_{\mathit{eff}}$ of the leaky modes and simulated leakage losses in decibels per meter (dB/m) experienced by the leaky modes in a multimode optical fiber having the refractive index profile described in FIG. 5. As depicted, leaky modes with real part of lower effective refractive indices (i.e., more negative) exhibit higher leakage losses.

Figure 7:
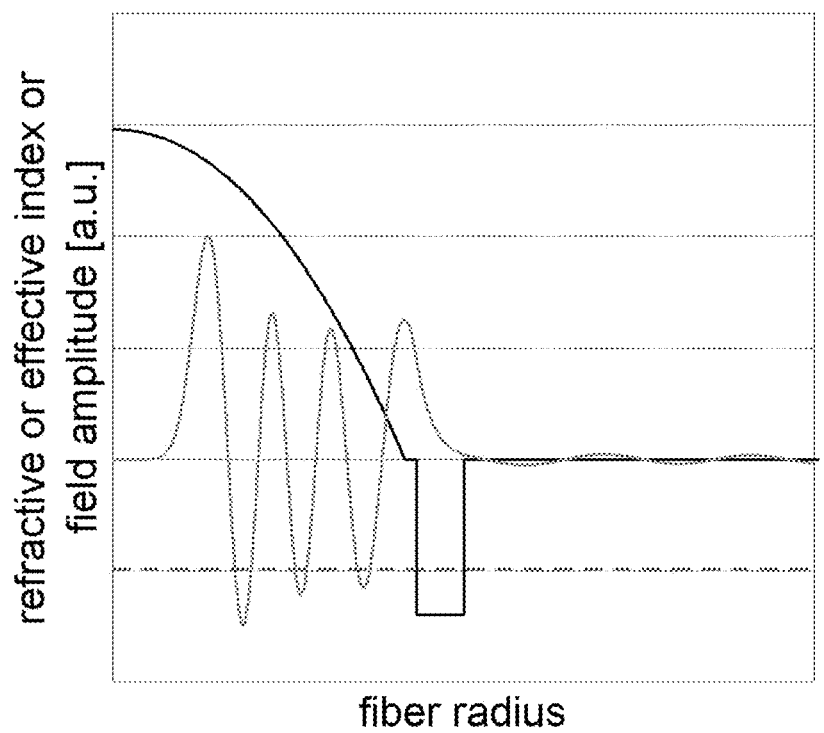
FIG. 7 depicts (i) the refractive index, (ii) the effective refractive index $n_{eff}$, and (iii) the field amplitude of a leaky mode as a function of radial offset in an exemplary graded-index multimode optical fiber including a depressed trench.
Figure 8:
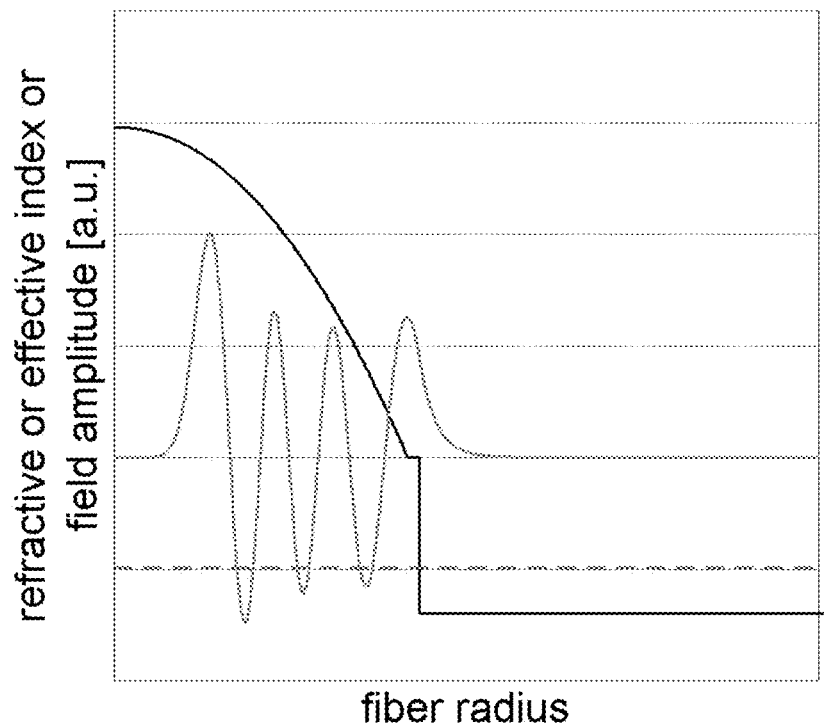
FIG. 8 depicts (i) the refractive index, (ii) the effective refractive index $n_{eff}$, and (iii) the field amplitude of the highest-order guided mode as a function of radial offset in a comparative graded-index multimode optical fiber.

FIG. 7 depicts (i) the real part of the refractive index, (ii) the effective refractive index $n_{\mathit{eff}}$, and (iii) the field amplitude as a function of radial offset for a leaky mode in an exemplary graded-index multimode optical fiber that includes a depressed trench. FIG. 8 depicts (i) the refractive index, (ii) the effective refractive index $n_{\mathit{eff}}$, and (iii) the field amplitude as a function of radial offset for the highest-order guided mode of a comparative graded-index multimode optical fiber. The comparative multimode optical fiber of FIG. 8 includes an outer cladding that is depressed to the same refractive index of the depressed trench in the exemplary optical fiber of FIG. 7 (i.e., below $LP_{12,7}$). The effective refractive indices $n_{\mathit{eff}}$ of the leaky modes in FIG. 7 have real parts (i.e., non-imaginary parts) similar to those of the highest-order guided modes FIG. 8.

Figure 9A:
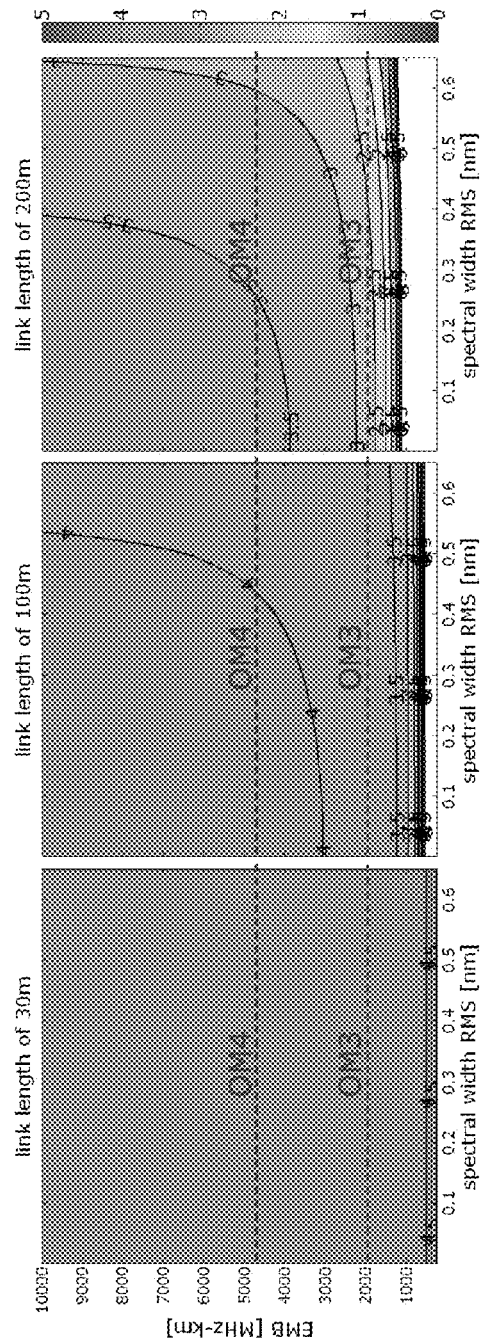
FIGS. 9A and 9B depict graphs plotting system margin as a function of both effective modal bandwidth and spectral width for a given link at different link lengths.
Figure 9B:
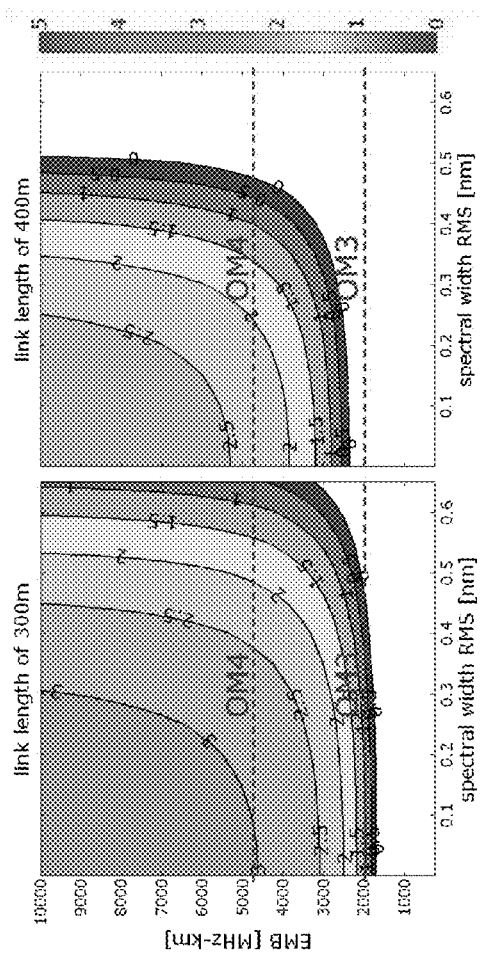

FIGS. 9A and 9B depict system margin as a function of both effective modal bandwidth and spectral width for given links at different link lengths. System margin is shown (i) in grayscale according to the legend provided on the right of FIGS. 9A and 9B and by (ii) the plotted contour lines.

The leftmost plot in FIG. 9A provides data for a link length of 30 meters. As demonstrated, for link lengths of 30 meters or less, the link's bandwidth is not a limiting factor for system margin provided that the link's effective modal bandwidth exceeds 250 MHz-km.

The central and rightmost plots in FIG. 9A provide data for link lengths of 100 meters and 200 meters, respectively. To achieve a margin of 0 dB at a 0.45-nanometer spectral width RMS, a 100-meter link should have an effective modal bandwidth of at least 500 MHz-km. To achieve a margin of 0 dB at a 0.45-nanometer spectral width RMS, a 200-meter link should have an effective modal bandwidth of at least 1100 MHz-km.

The left and right plots in FIG. 9B provide data for link lengths of 300 meters and 400 meters, respectively. To achieve a margin of 0 dB at a 0.45-nanometer spectral width RMS, a 300-meter link should have an effective modal bandwidth of at least 1,960 MHz-km. To achieve a margin of 0 dB at a 0.45-nanometer spectral width RMS, a 200-meter link should have an effective modal bandwidth of at least 3,880 MHz-km.

For regular multimode optical fibers (i.e., multimode optical fibers that are not designed for bend-insensitivity), the power of the light source coupled to the optical fiber is split into a guided-mode set with a limited effective modal bandwidth, thereby reducing system margins. Moreover, when the coupled power is split into the guided-mode set, a fraction of the coupled power is typically lost, which leads to insertion losses, thereby reducing system margins.

For a bend-insensitive multimode optical fiber having the same central core as a regular multimode optical fiber, the leaky modes catch a part of the coupled power that a regular multimode optical fiber would lose. In this regard (and as before), the power of the light source coupled to the optical fiber is split into a guided-mode set with a limited effective modal bandwidth, thereby reducing system margins. When the coupled power is split into the guided-mode set, a smaller fraction of the coupled power is lost than the percentage lost by a regular multimode optical fiber, because, as noted, the leaky modes capture part of the coupled power. As compared with a regular multimode optical fiber, a bend-insensitive multimode optical fiber typically has lower insertion losses and thus improved system margins. Furthermore, the coupled power split into the leaky modes can actually increase system margins.

The bandwidth of a multimode optical fiber (e.g., a link) depends on both the guided modes and the leaky modes. The following equations can be used to calculate bandwidth, assuming perfect synchronization between the leaky and the guided channels:

$$y(t) = (H_{guided}(t) + H_{leaky}(t)) \otimes x(t)$$

$$s_{in}(t) = x^2(t)$$

$$s_{out}(t) = y^2(t)$$

$$|\tilde{H}_{link}(f)|^2 = \frac{e^{-\frac{f^2}{\sigma_{guided}^2}} + A^2 \cdot e^{-\frac{f^2}{\sigma_{leaky}^2}} + 2 \cdot A \cdot e^{-\left(\frac{1}{2\sigma_{guided}^2} + \frac{1}{2\sigma_{leaky}^2}\right) \cdot f^2} \cdot \cos\Delta\Phi}{1 + A^2 + 2 \cdot A \cdot \cos\Delta\Phi}$$

where:
$H_{guided}(t)$ is the transfer function of the guided modes;
$H_{leaky}(t)$ is the transfer function of the leaky modes;
$s_{in}(t)$ is the input signal;
$s_{out}(t)$ is the output signal;
$H_{link}$ f is the transfer function of the link accounting both for leaky and guided modes;
$\sigma_{guided}$ is proportional to the bandwidth of the guided-mode-only channel;
$\sigma_{leaky}$ (or $EMB_{leaky}$) is proportional to the bandwidth of the leaky-mode-only channel;
$A^2$ is the ratio of leaky-mode power to guided-mode power; and
$\Delta\Phi$ is the global phase shift between the guided modes and the leaky modes, which depends on the average delay between the guided modes and leaky modes.

Figure 10:
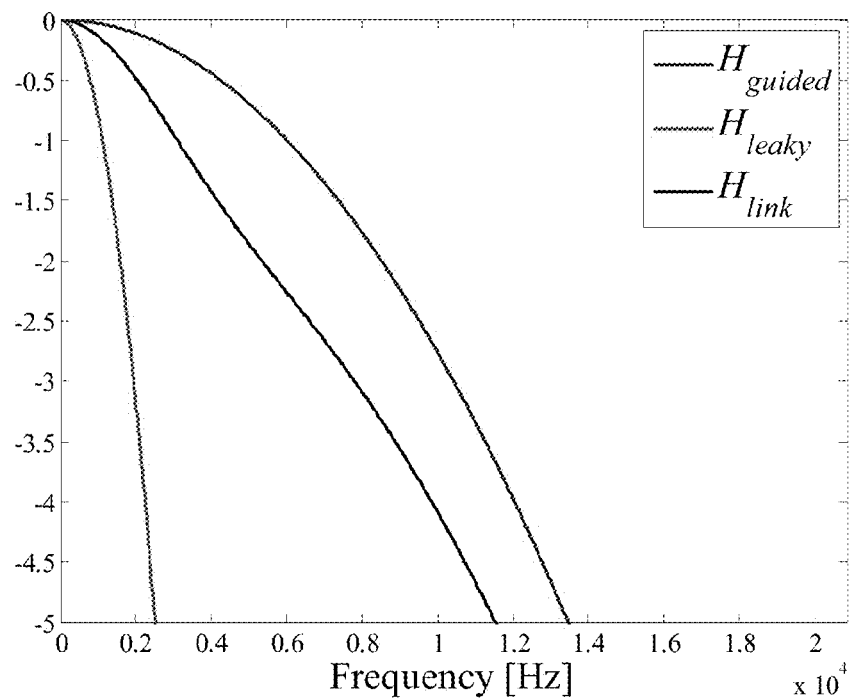
FIG. 10 depicts the transfer functions of the guided modes, the leaky modes, and the optical link for an exemplary optical fiber.

FIG. 10 depicts the transfer functions of the guided modes, the leaky modes, and the optical link for an exemplary multimode optical fiber. For this exemplary optical link, the effective modal bandwidth of the guided modes $EMB_{guided}$ is 10,500 MHz-km, and the effective modal bandwidth of the leaky modes ($EMB_{leaky}$) is 2,000 MHz-km. The ratio $A^2$ of leaky-mode power to guided-mode power is 16 percent, and the global phase shift $\Delta\Phi$ between the guided modes and the leaky modes is zero. These values yield an effective modal bandwidth of 4,700 MHz-km for this exemplary optical link.

To estimate the ratio $A^2$ of leaky-mode power to guided-mode power, the power coupled into the leaky modes can be assessed using insertion loss computations expected in a regular multimode optical fiber under Vertical-Cavity Surface-Emitting Laser (VCSEL) launches. In this regard, encircled flux (EF) and insertion loss modeling under random VCSEL launches can be performed, for example, using the methods described by Pepeljugoski et al. in "*Modeling and Simulation of Next-Generation Multimode Fiber Links,*"

Journal of Lightwave Technology, Vol. 21, No. 5 (May 2003), which is hereby incorporated by reference in its entirety.

Figure 11:
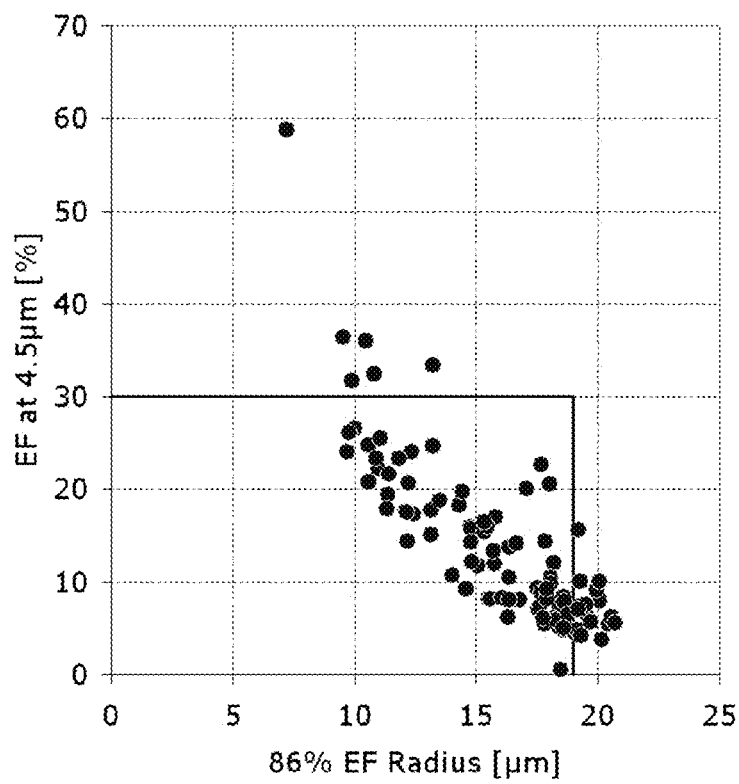
FIG. 11 depicts the encircled flux coordinates of the simulated Vertical-Cavity Surface-Emitting Lasers (VCSELs).
Figure 12:
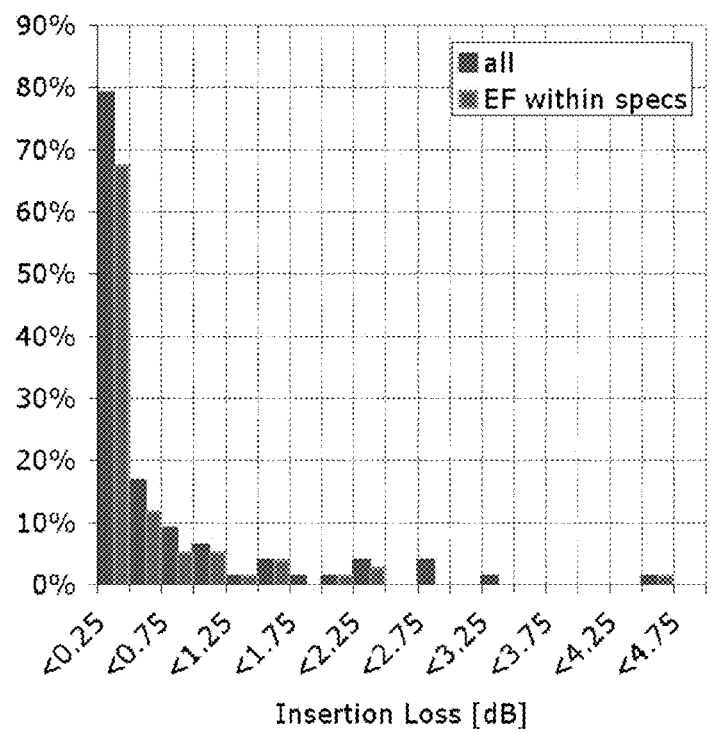
FIG. 12 depicts the distributions of insertion loss (IL) obtained with simulated VCSEL sources of FIG. 11.
Figure 13:
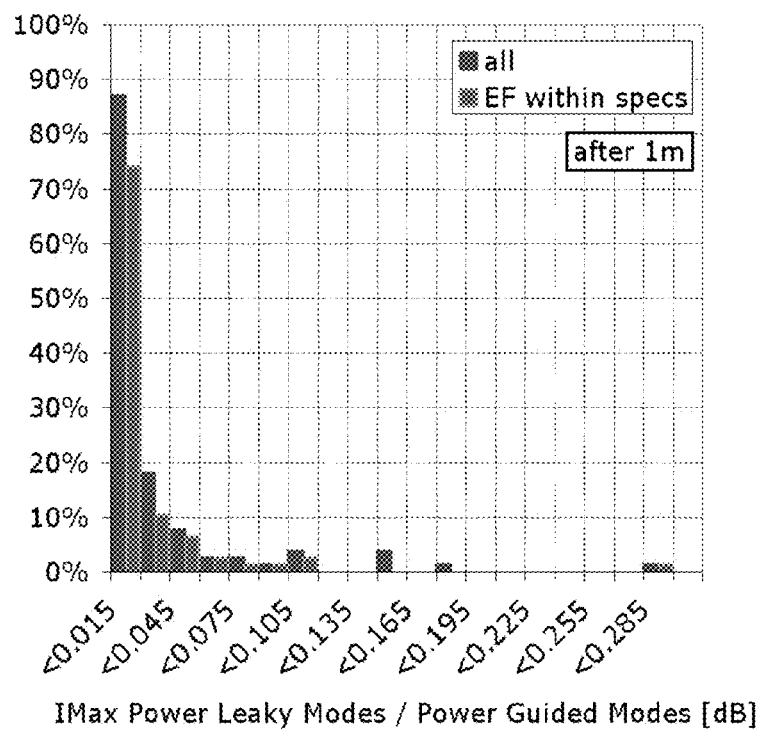
FIG. 13 depicts the distributions of power ratio between leaky modes and guided modes obtained with simulated VCSEL sources of FIG. 11.

FIG. 11 depicts the encircled flux coordinates of the simulated Vertical-Cavity Surface-Emitting Lasers (VCSELs). FIG. 12 depicts the distributions of insertion loss (IL) obtained with all of the simulated VCSEL sources (i.e., "all") and with only the simulated VCSEL sources that fulfill the encircled flux (EF) requirements of IEEE 802.3 Standard (i.e., "EF within specs"). FIG. 13 depicts the distributions of power ratio between leaky modes and guided modes obtained with all of the simulated VCSEL sources (i.e., "all") and with only the simulated VCSEL sources that fulfill the encircled flux (EF) requirements of IEEE 802.3 Standard (i.e., "EF within specs"). The IEEE 802.3 Standard, which is sometimes referred to as 10 GbE, is hereby incorporated by reference in its entirety. As shown by the data of FIGS. 11-13, for 98 percent of the launch conditions, the power of the leaky modes is less than 10 percent of the power of the guided modes after one meter of propagation (i.e., assuming the trench-assisted optical fiber has substantially the same core refractive-index profile as an otherwise identical conventional optical fiber).

Figure 14:
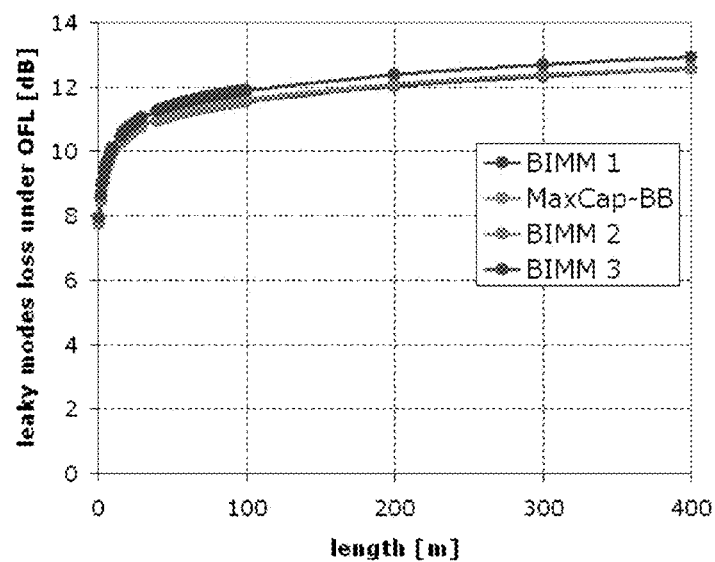
FIG. 14 graphically depicts, for four bend-insensitive multimode optical fibers, leakage losses of the leaky modes as a function of optical fiber length.

FIG. 14 graphically depicts leakage losses of the leaky modes as a function of optical fiber length. The four exemplary trench-assisted multimode optical fibers have inner-cladding widths of 1.0 micron, 1.5 microns (i.e., Draka's "MaxCap-BB"), 2.0 microns, and 3.0 microns, respectively, but are otherwise identical. As shown in FIG. 14, the power of the leaky modes decreases as fiber length increases. After one meter of propagation, the power of the leaky modes is attenuated by approximately 8 dB.

Figure 15:
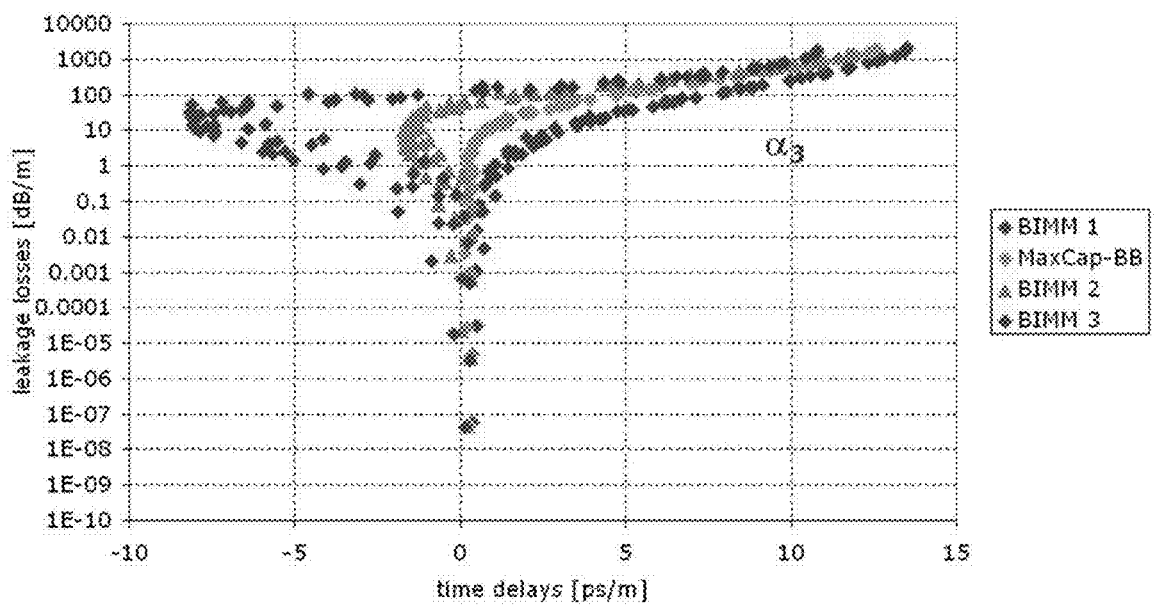
FIG. 15 graphically depicts, for the four bend-insensitive multimode optical fibers of FIG. 14, leakage losses per meter of the leaky modes as a function of time delay per meter.

FIG. 15 graphically depicts, for the four exemplary trench-assisted multimode optical fibers of FIG. 14, leakage losses (dB/m) of the leaky modes as a function of time delay (ps/m). The two dark diamond plots and the triangle plot represent data for comparative bend-insensitive multimode optical fibers. The light diamond plot represents data for a preferred bend-insensitive multimode optical fiber (i.e., MaxCap-BB). Thus, the data of FIG. 15 demonstrates that leakage losses and time delays for the leaky modes depend on the depressed trench's design. Additionally, the leaky modes with the greatest leakage losses exhibit the largest time delays.

Figure 16:
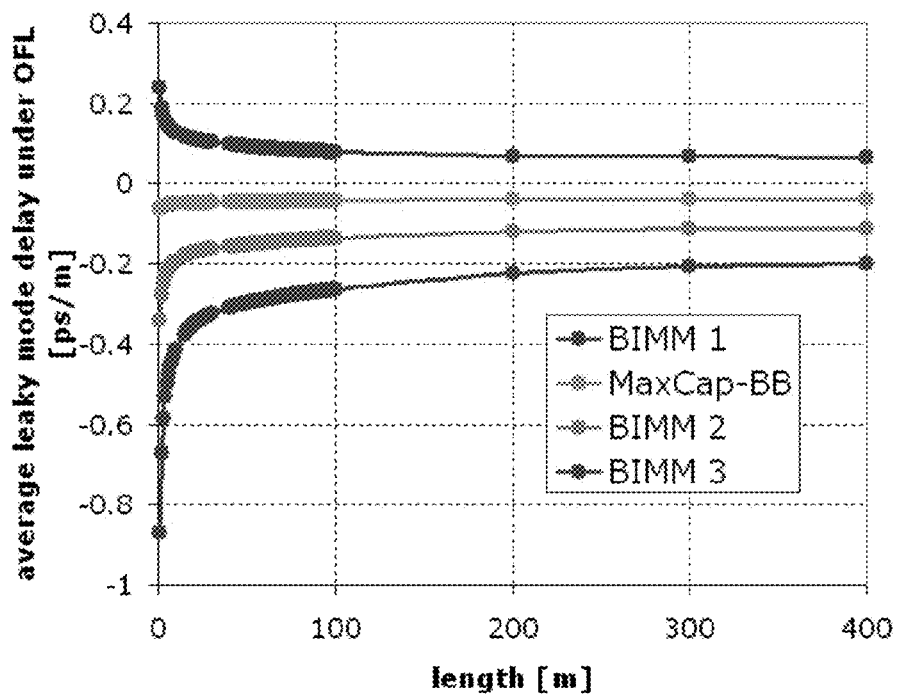
FIG. 16 graphically depicts, for the four bend-insensitive multimode optical fibers of FIGS. 14-15, the average time delay of each optical fiber's set of leaky modes under over-filled launch conditions as a function of optical fiber length.

FIG. 16 graphically depicts, for the four exemplary trench-assisted multimode optical fibers of FIGS. 14 and 15, the average time delay of each optical fiber's set of leaky modes under over-filled launch conditions as a function of optical fiber length. The uppermost plot and two lowest plots represent data for exemplary bend-insensitive multimode optical fibers. The plot with the relatively constant average time delay of slightly less than zero represents data for a preferred bend-insensitive multimode optical fiber (i.e., MaxCap-BB). In this regard, the leaky modes of the preferred bend-insensitive multimode optical fiber have an average time delay that does not vary with optical fiber length. Therefore, the average time delay of the leaky modes is both relatively small and predictable. For this preferred multimode optical fiber under over-filled launch conditions, the average delay between the guided modes and the leaky modes rapidly tends to zero as optical fiber length increases.

Figure 17:
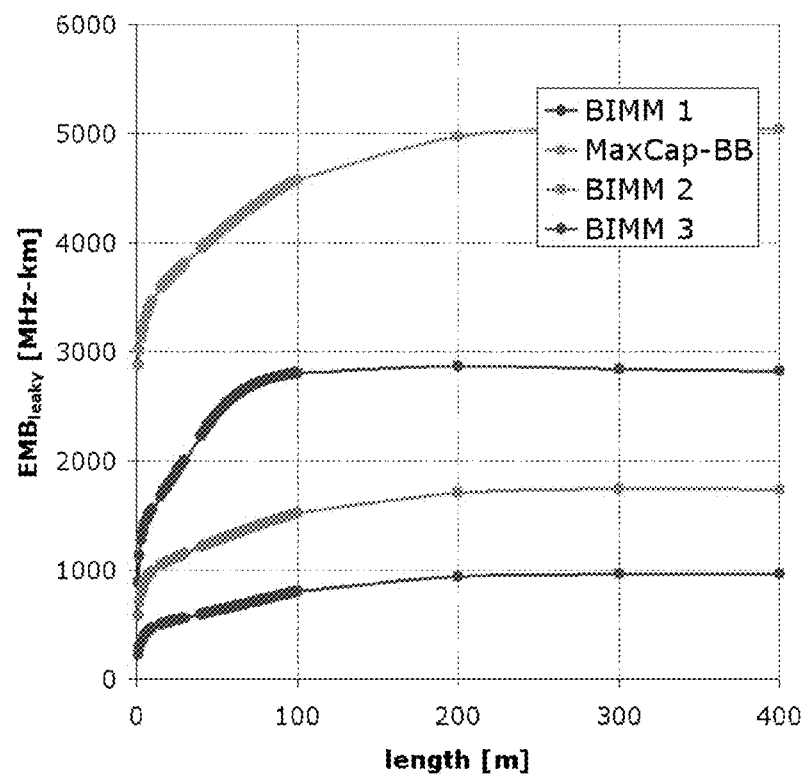
FIG. 17 graphically depicts, for the four bend-insensitive multimode optical fibers of FIGS. 14-16 under over-filled launch conditions, the effective modal bandwidth $EMB_{leaky}$ of the leaky modes as a function of optical fiber length.

Using data from FIGS. 11-16, the ratio $A^2$ of leaky-mode power to guided-mode power and the global phase shift $\Delta\Phi$ between the guided modes and the leaky modes can be estimated. These values can then be used to calculate the effective modal bandwidth $EMB_{leaky}$ of a given multimode optical fiber's leaky modes via the equations discussed previously. In this regard, FIG. 17 graphically depicts, for the four trench-assisted multimode optical fibers of FIGS. 14-16 under over-filled launch conditions, the effective modal bandwidth $EMB_{leaky}$ of the leaky modes as a function of optical fiber length. The uppermost plot represents data for the preferred bend-insensitive multimode optical fiber (i.e., MaxCap-BB), whereas the three lower plots represent data for the other exemplary bend-insensitive multimode optical fibers.

For the preferred multimode optical fiber (i.e., MaxCap-BB), the effective modal bandwidth $EMB_{leaky}$ of the leaky modes increases with optical fiber length. This increase in effective modal bandwidth $EMB_{leaky}$ of the leaky modes occurs because, as shown in FIG. 15, the leakage losses of the leaky modes typically increase as time delays increase. In other words, the leaky modes with the greatest time delays, which decrease $EMB_{leaky}$, experience greater leakage losses. As these delayed leaky modes propagate over the length of the optical fiber, their leakage losses increase, thereby reducing their detrimental effect on the optical fiber's effective modal bandwidth $EMB_{leaky}$. Indeed, FIG. 17 demonstrates that, for optical fiber lengths greater than one meter, the leaky modes of the exemplary multimode optical fiber (i.e., MaxCap-BB) have an effective modal bandwidth $EMB_{leaky}$ of greater than about 3,000 MHz-km (i.e., when initially all leaky modes are equally excited).

The leaky modes also impact the effective modal bandwidth of the optical link $EMB_{link}$. Assuming (i) a ratio $A^2$ of leaky-mode power to guided-mode power of 10 percent and (ii) the greatest global phase shift $\Delta\Phi$ between the guided modes and the leaky modes for the preferred optical fiber (i.e., MaxCap-BB), the leaky modes contribute an additional 10 percent power to the optical link, which can increase system margin by 0.4 dB. For optical fiber lengths of 100 meters, 200 meters, 300 meters, and 400 meters, exemplary multimode optical fibers have $EMB_{link}$ values of at least about 500 MHz-km, 1,100 MHz-km, 1,960 MHz-km, and 3,880 MHz-km, respectively.

Figure 18:
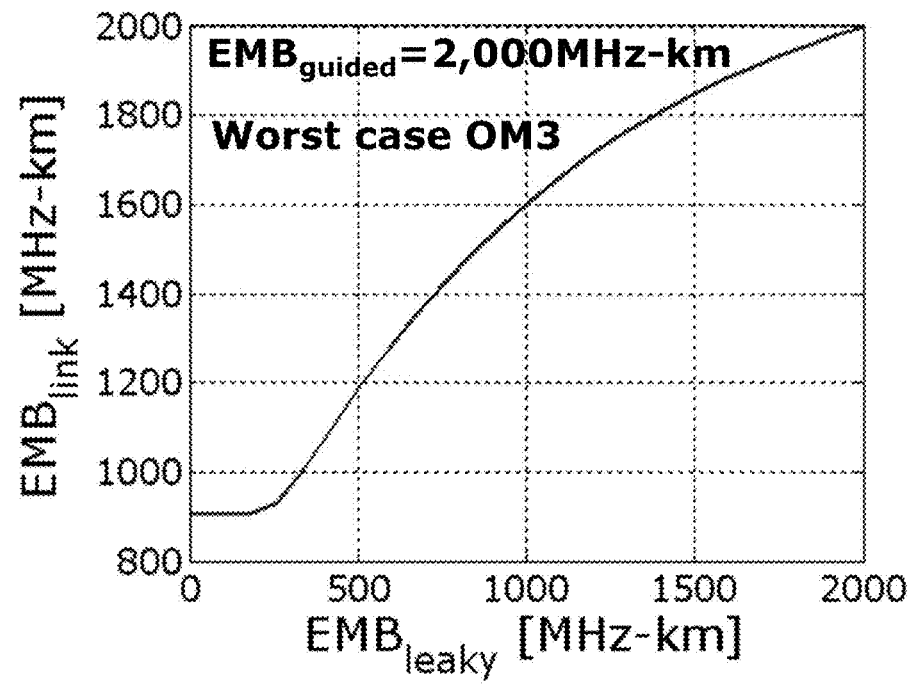
FIG. 18 graphically depicts the effective modal bandwidth of an optical link $EMB_{link}$ as a function of the effective modal bandwidth $EMB_{leaky}$ of the leaky modes.
Figure 19:
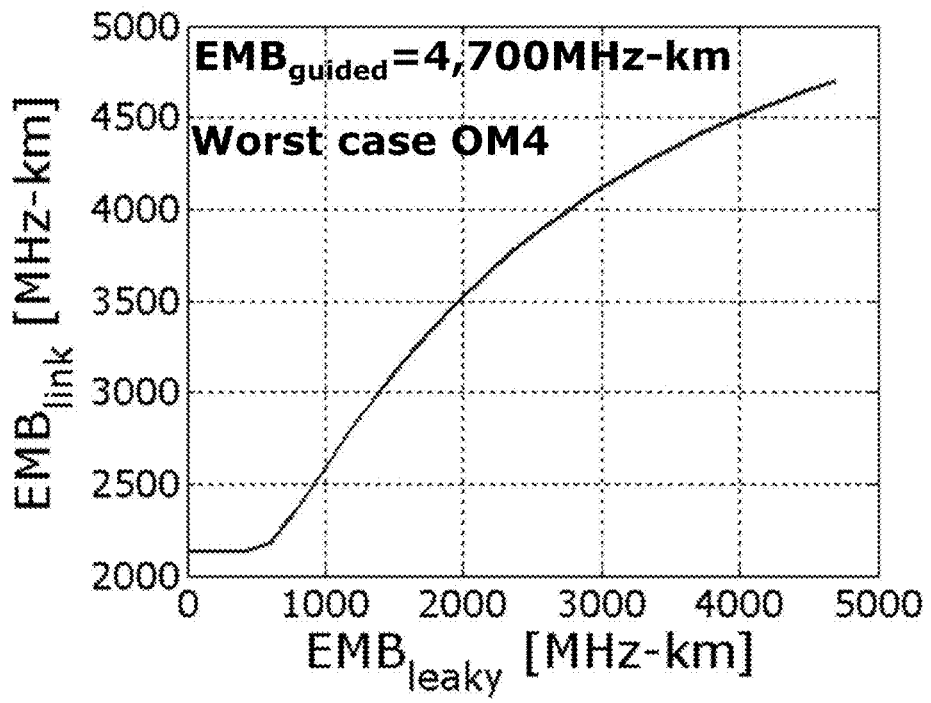
FIG. 19 graphically depicts the effective modal bandwidth of an optical link $EMB_{link}$ as a function of the effective modal bandwidth $EMB_{leaky}$ of the leaky modes.

FIGS. 18 and 19 graphically depict the effective modal bandwidth of an optical link $EMB_{link}$ as a function of the effective modal bandwidth $EMB_{leaky}$ of the leaky modes. For FIG. 18, the effective modal bandwidth $EMB_{guided}$ of the guided modes is set to 2,000 MHz-km (i.e., the lowest OM3-compliant value), and $A^2$ is set to 10 percent. For the graph of FIG. 19, the effective modal bandwidth $EMB_{guided}$ of the guided modes is set to 4,700 MHz-km (i.e., the lowest OM4-compliant value), and $A^2$ is set to 10 percent. (In either case, the phase shift $\Delta\Phi$ is not necessary to the calculation.)

FIG. 18 demonstrates that a multimode optical fiber having a leaky-mode effective modal bandwidth ($EMB_{leaky}$) of about 1,850 MHz-km or greater provides safe transmission with borderline OM3-compliant multimode optical fibers at 300 meters. FIG. 19 demonstrates that a multimode optical fiber having a leaky-mode effective modal bandwidth ($EMB_{leaky}$) of about 2,550 MHz-km or greater provides safe transmission with borderline OM4-compliant multimode optical fibers at 400 meters.

An exemplary multimode optical fiber includes a central core surrounded by an outer cladding. (For reasons of cost, the outer cladding is typically made of natural silica, but alternatively it may be made of doped silica.) The central core has an outer radius $r_1$ and an alpha-index profile with respect to the outer cladding. An inner cladding is positioned between the central core and the outer cladding (e.g., immediately surrounding the central core). The inner cladding has (i) an outer radius $r_2$, (ii) a width $w_2$, and (iii) a refractive index difference $\Delta n_2$ with respect to the outer cladding. A depressed trench is positioned between the inner cladding and the outer cladding (e.g., immediately surrounding the inner cladding).

The depressed trench has (i) an outer radius $r_t$, (ii) a width $w_t$, and (iii) a refractive index difference $\Delta n_t$ with respect to the outer cladding.

Typically, the central core has an outer radius $r_1$ of between about 23 microns and 27 microns (e.g., 25 microns). The refractive index difference between the central core and the outer cladding typically has a maximum value $\Delta n_1$ of between about $11 \times 10^{-3}$ and $16 \times 10^{-3}$ (e.g., between about $12 \times 10^{-3}$ and $15 \times 10^{-3}$, such as about $14.5 \times 10^{-3}$). The alpha-index profile of the central core has an alpha parameter $\alpha$ of between about 2.0 and 2.1 (e.g., between about 2.04 and 2.09, such as 2.06 or so).

Typically, the inner cladding immediately surrounds the central core. The inner cladding has a width $w_2$ of between about 1 and 3 microns, typically about 1.5 microns. The refractive index difference $\Delta n_2$ between the inner cladding and the outer cladding is typically between about $-0.05 \times 10^{-3}$ and $0.05 \times 10^{-3}$. More typically, the refractive index difference $\Delta n_2$ between the inner cladding and the outer cladding is approximately zero. The characteristics of the inner cladding facilitate the achievement of high bandwidths.

Typically, the depressed trench immediately surrounds the inner cladding. The depressed trench has a width $w_t$ of between about 3 and 5 microns (e.g., 4 microns). The refractive index difference $\Delta n_t$ between the depressed trench and the outer cladding is typically between about $-15 \times 10^{-3}$ and $-3 \times 10^{-3}$, more typically between about $-10 \times 10^{-3}$ and $-5 \times 10^{-3}$, such as $-6 \times 10^{-3}$. In this regard, the term "depressed trench" is used to describe a radial portion of an optical fiber that has a refractive index that is substantially less than the refractive index of the outer cladding.

In view of the foregoing, a particular exemplary multimode optical fiber (e.g., MaxCap-BB) might include a 50-micron-diameter, graded-index central core defined by an alpha parameter $\alpha$ of about 2.06 and having a maximum refractive index difference $\Delta n_1$ with the outer cladding of about $14.5 \times 10^{-3}$ (e.g., $\Delta n_1 \approx 1\%$). An inner cladding, which contiguously surrounds the central core, might have a width $w_2$ of about 1.5 microns and a negligible refractive index difference $\Delta n_2$ with the outer cladding. A depressed trench, which contiguously surrounds the inner cladding, might have a width $w_t$ of about 4 microns and refractive index difference $\Delta n_t$ with the outer cladding of about $-6 \times 10^{-3}$.

This particular, exemplary multimode optical fiber (e.g., Draka's MaxCap-BB) exhibits, at a wavelength between about 840 nanometers and 860 nanometers, a leaky-mode bandwidth ($EMB_{leaky}$) of about 1,850 MHz-km or greater at 300 meters (e.g., for OM3 compliance) and/or a leaky-mode bandwidth ($EMB_{leaky}$) of about 2,550 MHz-km or greater at 400 meters (e.g., for OM4 compliance). As noted, these leaky-mode bandwidths satisfy the safe-transmission requirements for OM3-compliant bend-insensitive multimode optical fibers and OM4-compliant bend-insensitive multimode optical fibers, respectively.

In another exemplary embodiment, the present multimode optical fiber exhibits, at a wavelength of about 850 nanometers, a leaky-mode bandwidth ($EMB_{leaky}$) of about 5,000 MHz-km or greater at 300 meters (e.g., between about 7,500 MHz-km and 10,000 MHz-km).

In yet another exemplary embodiment, the present multimode optical fiber exhibits, at a wavelength of about 850 nanometers, a leaky-mode bandwidth ($EMB_{leaky}$) of about 7,500 MHz-km or greater at 400 meters (e.g., 10,000 MHz-km or greater).

The OM3 standard requires, at a wavelength of 850 nanometers, an EMB of at least 2,000 MHz·km. The OM3 standard assures error-free transmissions for a data rate of 10 Gb/s (10 GbE) up to a distance of 300 meters. The OM4 standard requires, at a wavelength of 850 nanometers, an EMB of at least 4,700 MHz·km to obtain error-free transmissions for a data rate of 10 Gb/s (10 GbE) up to a distance of 400 meters. Each of the OM3 and OM4 standards is hereby incorporated by reference in its entirety.

The present optical fibers may facilitate the reduction in overall optical-fiber diameter. As will be appreciated by those having ordinary skill in the art, a reduced-diameter optical fiber is cost-effective, requiring less raw material. Moreover, a reduced-diameter optical fiber requires less deployment space (e.g., within a buffer tube and/or fiber optic cable), thereby facilitating increased fiber count and/or reduced cable size.

Those having ordinary skill in the art will recognize that an optical fiber with a primary coating (and an optional secondary coating and/or ink layer) typically has an outer diameter of between about 235 microns and about 265 microns (μm). The component glass fiber itself (i.e., the glass core and surrounding cladding layers) typically has a diameter of about 125 microns, such that the total coating thickness is typically between about 55 microns and 70 microns.

With respect to the present optical fiber, the component glass fiber typically has an outer diameter of about 125 microns. With respect to the optical fiber's surrounding coating layers, the primary coating typically has an outer diameter of between about 175 microns and about 195 microns (i.e., a primary coating thickness of between about 25 microns and 35 microns), and the secondary coating typically has an outer diameter of between about 235 microns and about 265 microns (i.e., a secondary coating thickness of between about 20 microns and 45 microns). Optionally, the present optical fiber may include an outermost ink layer, which is typically between two and ten microns in thickness.

In one alternative embodiment, an optical fiber may possess a reduced diameter (e.g., an outermost diameter between about 150 microns and 230 microns). In this alternative optical fiber configuration, the thickness of the primary coating and/or secondary coating is reduced, while the diameter of the component glass fiber is maintained at about 125 microns. (Those having ordinary skill in the art will appreciate that, unless otherwise specified, diameter measurements refer to outer diameters.)

By way of illustration, in such exemplary embodiments, the primary coating layer may have an outer diameter of between about 135 microns and about 175 microns (e.g., about 160 microns), typically less than 165 microns (e.g., between about 135 microns and 150 microns), and usually more than 140 microns (e.g., between about 145 microns and 155 microns, such as about 150 microns).

Moreover, in such exemplary embodiments, the secondary coating layer may have an outer diameter of between about 150 microns and about 230 microns (e.g., more than about 165 microns, such as 190-210 microns or so), typically between about 180 microns and 200 microns. In other words, the total diameter of the optical fiber is reduced to less than about 230 microns (e.g., between about 195 microns and 205 microns, and especially about 200 microns). By way of further illustration, an optical fiber may employ a secondary coating of about 197 microns at a tolerance of +/−5 microns (i.e., a secondary-coating outer diameter of between 192 microns to 202 microns). Typically, the secondary coating will retain a thickness of at least about 10 microns (e.g., an optical fiber having a reduced thickness secondary coating of between 15 microns and 25 microns).

In another alternative embodiment, the outer diameter of the component glass fiber may be reduced to less than 125 microns (e.g., between about 60 microns and 120 microns), perhaps between about 70 microns and 115 microns (e.g., about 80-110 microns). This may be achieved, for instance, by reducing the thickness of one or more cladding layers. As compared with the prior alternative embodiment, (i) the total diameter of the optical fiber may be reduced (i.e., the thickness of the primary and secondary coatings are maintained in accordance with the prior alternative embodiment) or (ii) the respective thicknesses of the primary and/or secondary coatings may be increased relative to the prior alternative embodiment (e.g., such that the total diameter of the optical fiber might be maintained).

By way of illustration, with respect to the former, a component glass fiber having a diameter of between about 90 and 100 microns might be combined with a primary coating layer having an outer diameter of between about 110 microns and 150 microns (e.g., about 125 microns) and a secondary coating layer having an outer diameter of between about 130 microns and 190 microns (e.g., about 155 microns). With respect to the latter, a component glass fiber having a diameter of between about 90 and 100 microns might be combined with a primary coating layer having an outer diameter of between about 120 microns and 140 microns (e.g., about 130 microns) and a secondary coating layer having an outer diameter of between about 160 microns and 230 microns (e.g., about 195-200 microns).

Reducing the diameter of the component glass fiber might make the resulting optical fiber more susceptible to microbending attenuation. That said, the advantages of further reducing optical-fiber diameter might be worthwhile for some optical-fiber applications.

As noted, the present optical fibers may include one or more coating layers (e.g., a primary coating and a secondary coating). At least one of the coating layers—typically the secondary coating—may be colored and/or possess other markings to help identify individual fibers. Alternatively, a tertiary ink layer may surround the primary and secondary coatings.

The present optical fibers may be manufactured by drawing from final preforms.

A final preform may be manufactured by providing a primary preform with an outer overcladding layer (i.e., an overcladding process). The outer overcladding layer typically consists of doped or undoped, natural or synthetic, silica glass. Several methods are available for providing the outer overcladding layer.

In a first exemplary method, the outer overcladding layer may be provided by depositing and vitrifying natural or synthetic silica particles on the outer periphery of the primary preform under the influence of heat. Such a process is known, for example, from U.S. Pat. Nos. 5,522,007, 5,194,714, 6,269,663, and 6,202,447, each of which is hereby incorporated by reference in its entirety.

In another exemplary method, a primary preform may be overcladded using a silica sleeve tube, which may or may not be doped. This sleeve tube may then be collapsed onto the primary preform.

In yet another exemplary method, an overcladding layer may be applied via an Outside Vapor Deposition (OVD) method. Here, a soot layer is first deposited on the outer periphery of a primary preform, and then the soot layer is vitrified to form glass.

Primary preforms may be manufactured via outside vapor deposition techniques, such as Outside Vapor Deposition (OVD) and Vapor Axial Deposition (VAD). Alternatively, primary preforms may be manufactured via inside deposition techniques in which glass layers are deposited on the inner surface of a substrate tube of doped or undoped silica glass, such as Modified Chemical Vapor Deposition (MCVD), Furnace Chemical Vapor Deposition (FCVD), and Plasma Chemical Vapor Deposition (PCVD).

By way of example, primary preforms may be manufactured using a PCVD process, which can precisely control the central core's gradient refractive index profile.

A depressed trench, for instance, may be deposited on the inner surface of a substrate tube as part of the chemical vapor deposition process. More typically, a depressed trench may be manufactured either (i) by using a fluorine-doped substrate tube as the starting point of the internal deposition process for deposition of the gradient refractive index central core or (ii) by sleeving a fluorine-doped silica tube over the gradient refractive index central core, which itself may be produced using an outside deposition process (e.g., OVD or VAD). Accordingly, a component glass fiber manufactured from the resulting preform may have a depressed trench located near the periphery of its central core.

As noted, a primary preform may be manufactured via an inside deposition process using a fluorine-doped substrate tube. The resulting tube containing the deposited layers may be sleeved by one or more additional fluorine-doped silica tubes so as to increase the thickness of a depressed trench, or to create a depressed trench having a varying refractive index over its width. Although not required, one or more additional sleeve tubes (e.g., fluorine-doped substrate tubes) may be collapsed onto the primary preform before an overcladding step is carried out. The process of sleeving and collapsing is sometimes referred to as jacketing and may be repeated to build several glass layers on the outside of the primary preform.

The present optical fibers may be deployed in various structures, such as those exemplary structures disclosed hereinafter.

For example, one or more of the present optical fibers may be enclosed within a buffer tube. For instance, optical fiber may be deployed in either a single-fiber loose buffer tube or a multi-fiber loose buffer tube. With respect to the latter, multiple optical fibers may be bundled or stranded within a buffer tube or other structure. In this regard, within a multi-fiber loose buffer tube, fiber sub-bundles may be separated with binders (e.g., each fiber sub-bundle is enveloped in a binder). Moreover, fan-out tubing may be installed at the termination of such loose buffer tubes to directly terminate loose buffered optical fibers with field-installed connectors.

In other embodiments, the buffer tube may tightly surround the outermost optical fiber coating (i.e., tight buffered fiber) or otherwise surround the outermost optical-fiber coating or ink layer to provide an exemplary radial clearance of between about 50 and 100 microns (i.e., a semi-tight buffered fiber).

With respect to the former tight buffered fiber, the buffering may be formed by coating the optical fiber with a curable composition (e.g., a UV-curable material) or a thermoplastic material. The outer diameter of tight buffer tubes, regardless of whether the buffer tube is formed from a curable or non-curable material, is typically less than about 1,000 microns (e.g., either about 500 microns or about 900 microns).

With respect to the latter semi-tight buffered fiber, a lubricant may be included between the optical fiber and the buffer tube (e.g., to provide a gliding layer).

As will be known by those having ordinary skill in the art, an exemplary buffer tube enclosing optical fibers as disclosed herein may be formed of polyolefins (e.g., polyethylene or polypropylene), including fluorinated polyolefins, polyesters (e.g., polybutylene terephthalate), polyamides (e.g., nylon), as well as other polymeric materials and blends. In general, a buffer tube may be formed of one or more layers. The layers may be homogeneous or include mixtures or blends of various materials within each layer.

In this context, the buffer tube may be extruded (e.g., an extruded polymeric material) or pultruded (e.g., a pultruded, fiber-reinforced plastic). By way of example, the buffer tube may include a material to provide high temperature and chemical resistance (e.g., an aromatic material or polysulfone material).

Although buffer tubes typically have a circular cross section, buffer tubes alternatively may have an irregular or non-circular shape (e.g., an oval or a trapezoidal cross-section).

Alternatively, one or more of the present optical fibers may simply be surrounded by an outer protective sheath or encapsulated within a sealed metal tube. In either structure, no intermediate buffer tube is necessarily required.

Multiple optical fibers as disclosed herein may be sandwiched, encapsulated, and/or edge bonded to form an optical fiber ribbon. Optical fiber ribbons can be divisible into subunits (e.g., a twelve-fiber ribbon that is splittable into six-fiber subunits). Moreover, a plurality of such optical fiber ribbons may be aggregated to form a ribbon stack, which can have various sizes and shapes.

For example, it is possible to form a rectangular ribbon stack or a ribbon stack in which the uppermost and lowermost optical fiber ribbons have fewer optical fibers than those toward the center of the stack. This construction may be useful to increase the density of optical elements (e.g., optical fibers) within the buffer tube and/or cable.

In general, it is desirable to increase the filling of transmission elements in buffer tubes or cables, subject to other constraints (e.g., cable or mid-span attenuation). The optical elements themselves may be designed for increased packing density. For example, the optical fiber may possess modified properties, such as improved refractive-index profile, core or cladding dimensions, or primary-coating thickness and/or modulus, to improve microbending and macrobending characteristics.

By way of example, a rectangular ribbon stack may be formed with or without a central twist (i.e., a "primary twist"). Those having ordinary skill in the art will appreciate that a ribbon stack is typically manufactured with rotational twist to allow the tube or cable to bend without placing excessive mechanical stress on the optical fibers during winding, installation, and use. In a structural variation, a twisted (or untwisted) rectangular ribbon stack may be further formed into a coil-like configuration (e.g., a helix) or a wave-like configuration (e.g., a sinusoid). In other words, the ribbon stack may possess regular "secondary" deformations.

As will be known to those having ordinary skill in the art, such optical fiber ribbons may be positioned within a buffer tube or other surrounding structure, such as a buffer-tube-free cable. Subject to certain restraints (e.g., attenuation), it is desirable to increase the density of elements such as optical fibers or optical fiber ribbons within buffer tubes and/or optical fiber cables.

A plurality of buffer tubes containing optical fibers (e.g., loose or ribbonized fibers) may be positioned externally adjacent to and stranded around a central strength member. This stranding can be accomplished helically in one direction, known as "S" or "Z" stranding, or via Reverse Oscillated Lay stranding, known as "S-Z" stranding. Stranding about the central strength member reduces optical fiber strain when cable strain occurs during installation and use.

Those having ordinary skill in the art will understand the benefit of minimizing fiber strain for both tensile cable strain and longitudinal compressive cable strain during installation or operating conditions.

With respect to tensile cable strain, which may occur during installation, the cable will become longer while the optical fibers can migrate closer to the cable's neutral axis to reduce, if not eliminate, the strain being translated to the optical fibers. With respect to longitudinal compressive strain, which may occur at low operating temperatures due to shrinkage of the cable components, the optical fibers will migrate farther away from the cable's neutral axis to reduce, if not eliminate, the compressive strain being translated to the optical fibers.

In a variation, two or more substantially concentric layers of buffer tubes may be positioned around a central strength member. In a further variation, multiple stranding elements (e.g., multiple buffer tubes stranded around a strength member) may themselves be stranded around each other or around a primary central strength member.

Alternatively, a plurality of buffer tubes containing optical fibers (e.g., loose or ribbonized fibers) may be simply placed externally adjacent to the central strength member (i.e., the buffer tubes are not intentionally stranded or arranged around the central strength member in a particular manner and run substantially parallel to the central strength member).

Alternatively still, the present optical fibers may be positioned within a central buffer tube (i.e., the central buffer tube cable has a central buffer tube rather than a central strength member). Such a central buffer tube cable may position strength members elsewhere. For instance, metallic or non-metallic (e.g., GRP) strength members may be positioned within the cable sheath itself, and/or one or more layers of high-strength yarns (e.g., aramid or non-aramid yarns) may be positioned parallel to or wrapped (e.g., contrahelically) around the central buffer tube (i.e., within the cable's interior space). As will be understood by those having ordinary skill in the art, such strength yarns provide tensile strength to fiber optic cables. Likewise, strength members can be included within the buffer tube's casing.

Strength yarns may be coated with a lubricant (e.g., fluoropolymers), which may reduce unwanted attenuation in fiber optic cables (e.g., rectangular, flat ribbon cables or round, loose tube cables) that are subjected to relatively tight bends (i.e., a low bend radius). Moreover, the presence of a lubricant on strength yarns (e.g., aramid strength yarns) may facilitate removal of the cable jacketing by reducing unwanted bonding between the strength yarns and the surrounding cable jacket.

In other embodiments, the optical fibers may be placed within a slotted core cable. In a slotted core cable, optical fibers, individually or as a fiber ribbon, may be placed within pre-shaped helical grooves (i.e., channels) on the surface of a central strength member, thereby forming a slotted core unit. The slotted core unit may be enclosed by a buffer tube. One or more of such slotted core units may be placed within a slotted core cable. For example, a plurality of slotted core units may be helically stranded around a central strength member.

Alternatively, the optical fibers may also be stranded in a maxitube cable design, whereby the optical fibers are stranded around themselves within a large multi-fiber loose buffer tube rather than around a central strength member. In other words, the large multi-fiber loose buffer tube is centrally positioned within the maxitube cable. For example, such maxitube cables may be deployed in optical ground wires (OPGW).

In another cabling embodiment, multiple buffer tubes may be stranded around themselves without the presence of a central member. These stranded buffer tubes may be surrounded by a protective tube. The protective tube may serve as the outer casing of the fiber optic cable or may be further surrounded by an outer sheath. The protective tube may either tightly surround or loosely surround the stranded buffer tubes.

As will be known to those having ordinary skill in the art, additional elements may be included within a cable core. For example, copper cables or other active, transmission elements may be stranded or otherwise bundled within the cable sheath. Passive elements may also be placed within the cable core, such as between the interior walls of the buffer tubes and the enclosed optical fibers. Alternatively and by way of example, passive elements may be placed outside the buffer tubes between the respective exterior walls of the buffer tubes and the interior wall of the cable jacket, or within the interior space of a buffer-tube-free cable.

For example, yarns, nonwovens, fabrics (e.g., tapes), foams, or other materials containing water-swellable material and/or coated with water-swellable materials (e.g., including super absorbent polymers (SAPs), such as SAP powder) may be employed to provide water blocking and/or to couple the optical fibers to the surrounding buffer tube and/or cable jacketing (e.g., via adhesion, friction, and/or compression). Exemplary water-swellable elements are disclosed in commonly assigned U.S. Pat. No. 7,515,795 for a Water-Swellable Tape, Adhesive-Backed for Coupling When Used Inside a Buffer Tube, which is hereby incorporated by reference in its entirety.

Moreover, an adhesive (e.g., a hot-melt adhesive or curable adhesive, such as a silicone acrylate cross-linked by exposure to actinic radiation) may be provided on one or more passive elements (e.g., water-swellable material) to bond the elements to the buffer tube. An adhesive material may also be used to bond the water-swellable element to optical fibers within the buffer tube. Exemplary arrangements of such elements are disclosed in commonly assigned U.S. Pat. No. 7,599,589 for a Gel-Free Buffer Tube with Adhesively Coupled Optical Element, which is hereby incorporated by reference in its entirety.

The buffer tubes (or buffer-tube-free cables) may also contain a thixotropic composition (e.g., grease or grease-like gels) between the optical fibers and the interior walls of the buffer tubes. For example, filling the free space inside a buffer tube with water-blocking, petroleum-based filling grease helps to block the ingress of water. Further, the thixotropic filling grease mechanically (i.e., viscously) couples the optical fibers to the surrounding buffer tube.

Such thixotropic filling greases are relatively heavy and messy, thereby hindering connection and splicing operations. Thus, the present optical fibers may be deployed in dry cable structures (i.e., grease-free buffer tubes).

Exemplary buffer tube structures that are free from thixotropic filling greases are disclosed in commonly assigned U.S. Pat. No. 7,724,998 for a Coupling Composition for Optical Fiber Cables (Parris et al.), which is hereby incorporated by reference in its entirety. Such buffer tubes employ coupling compositions formed from a blend of high-molecular weight elastomeric polymers (e.g., about 35 weight percent or less) and oils (e.g., about 65 weight percent or more) that flow at low temperatures. Unlike thixotropic filling greases, the coupling composition (e.g., employed as a cohesive gel or foam) is typically dry and, therefore, less messy during splicing.

As will be understood by those having ordinary skill in the art, a cable enclosing optical fibers as disclosed herein may have a sheath formed from various materials in various designs. Cable sheathing may be formed from polymeric materials such as, for example, polyethylene, polypropylene, polyvinyl chloride (PVC), polyamides (e.g., nylon), polyester (e.g., PBT), fluorinated plastics (e.g., perfluorethylene propylene, polyvinyl fluoride, or polyvinylidene difluoride), and ethylene vinyl acetate. The sheath and/or buffer tube materials may also contain other additives, such as nucleating agents, flame-retardants, smoke-retardants, antioxidants, UV absorbers, and/or plasticizers.

The cable sheathing may be a single jacket formed from a dielectric material (e.g., non-conducting polymers), with or without supplemental structural components that may be used to improve the protection (e.g., from rodents) and strength provided by the cable sheath. For example, one or more layers of metallic (e.g., steel) tape, along with one or more dielectric jackets, may form the cable sheathing. Metallic or fiberglass reinforcing rods (e.g., GRP) may also be incorporated into the sheath. In addition, aramid, fiberglass, or polyester yarns may be employed under the various sheath materials (e.g., between the cable sheath and the cable core), and/or ripcords may be positioned, for example, within the cable sheath.

Similar to buffer tubes, optical fiber cable sheaths typically have a circular cross section, but cable sheaths alternatively may have an irregular or non-circular shape (e.g., an oval, trapezoidal, or flat cross-section).

By way of example, the present optical fiber may be incorporated into single-fiber drop cables, such as those employed for Multiple Dwelling Unit (MDU) applications. In such deployments, the cable jacketing must exhibit crush resistance, abrasion resistance, puncture resistance, thermal stability, and fire resistance as required by building codes. An exemplary material for such cable jackets is thermally stable, flame-retardant polyurethane (PUR), which mechanically protects the optical fibers yet is sufficiently flexible to facilitate easy MDU installations. Alternatively, a flame-retardant polyolefin or polyvinyl chloride sheath may be used.

In general, and as will be known to those having ordinary skill in the art, a strength member is typically in the form of a rod or braided/helically wound wires or fibers, though other configurations will be within the knowledge of those having ordinary skill in the art.

Optical fiber cables containing optical fibers as disclosed may be variously deployed, including as drop cables, distribution cables, feeder cables, trunk cables, and stub cables, each of which may have varying operational requirements (e.g., temperature range, crush resistance, UV resistance, and minimum bend radius).

Such optical fiber cables may be installed within ducts, microducts, plenums, or risers. By way of example, an optical fiber cable may be installed in an existing duct or microduct by pulling or blowing (e.g., using compressed air). An exemplary cable installation method is disclosed in commonly assigned U.S. Pat. No. 7,574,095 for a Communication Cable Assembly and Installation Method (Lock et al.), and U.S. Pat. No. 7,665,902 for a Modified Pre-Ferrulized Communication Cable Assembly and Installation Method (Griffioen et al.), each of which is incorporated by reference in its entirety.

As noted, buffer tubes containing optical fibers (e.g., loose or ribbonized fibers) may be stranded (e.g., around a central strength member). In such configurations, an optical fiber cable's protective outer sheath may have a textured outer surface that periodically varies lengthwise along the cable in a manner that replicates the stranded shape of the underlying buffer tubes. The textured profile of the protective outer sheath can improve the blowing performance of the optical fiber cable. The textured surface reduces the contact surface between the cable and the duct or microduct and increases the friction between the blowing medium (e.g., air) and the cable. The protective outer sheath may be made of a low coefficient-of-friction material, which can facilitate blown installation. Moreover, the protective outer sheath can be provided with a lubricant to further facilitate blown installation.

In general, to achieve satisfactory long-distance blowing performance (e.g., between about 3,000 to 5,000 feet or more), the outer cable diameter of an optical fiber cable should be no more than about 70 to 80 percent of the duct's or microduct's inner diameter.

Compressed air may also be used to install optical fibers in an air blown fiber system. In an air blown fiber system, a network of unfilled cables or microducts is installed prior to the installation of optical fibers. Optical fibers may subsequently be blown into the installed cables as necessary to support the network's varying requirements.

Moreover, the optical fiber cables may be directly buried in the ground or, as an aerial cable, suspended from a pole or pylon. An aerial cable may be self-supporting, or secured or lashed to a support (e.g., messenger wire or another cable). Exemplary aerial fiber optic cables include overhead ground wires (OPGW), all-dielectric self-supporting cables (ADSS), all dielectric lash cables (AD-Lash), and figure-eight cables, each of which is well understood by those having ordinary skill in the art. Figure-eight cables and other designs can be directly buried or installed into ducts, and may optionally include a toning element, such as a metallic wire, so that they can be found with a metal detector.

In addition, although the optical fibers may be further protected by an outer cable sheath, the optical fiber itself may be further reinforced so that the optical fiber may be included within a breakout cable, which allows for the individual routing of individual optical fibers.

To effectively employ the present optical fibers in a transmission system, connections are required at various points in the network. Optical fiber connections are typically made by fusion splicing, mechanical splicing, or mechanical connectors.

The mating ends of connectors can be installed to the optical fiber ends either in the field (e.g., at the network location) or in a factory prior to installation into the network. The ends of the connectors are mated in the field in order to connect the optical fibers together or connect the optical fibers to the passive or active components. For example, certain optical fiber cable assemblies (e.g., furcation assemblies) can separate and convey individual optical fibers from a multiple optical fiber cable to connectors in a protective manner.

The deployment of such optical fiber cables may include supplemental equipment, which itself may employ the present optical fiber as previously disclosed. For instance, an amplifier may be included to improve optical signals. Dispersion compensating modules may be installed to reduce the effects of chromatic dispersion and polarization mode dispersion. Splice boxes, pedestals, and distribution frames, which may be protected by an enclosure, may likewise be included. Additional elements include, for example, remote terminal switches, optical network units, optical splitters, and central office switches.

A cable containing the present optical fibers may be deployed for use in a communication system (e.g., networking or telecommunications). A communication system may include fiber optic cable architecture such as fiber-to-the-node (FTTN), fiber-to-the-telecommunications enclosure (FTTE), fiber-to-the-curb (FTTC), fiber-to-the-building (FTTB), and fiber-to-the-home (FTTH), as well as long-haul or metro architecture. Moreover, an optical module or a storage box that includes a housing may receive a wound portion of the optical fiber disclosed herein. By way of example, the optical fiber may be wound around a bending radius of less than about 15 millimeters (e.g., 10 millimeters or less, such as about 5 millimeters) in the optical module or the storage box.

Moreover, present optical fibers may be used in other applications, including, without limitation, fiber optic sensors or illumination applications (e.g., lighting).

The present optical fibers may include Fiber Bragg Grating (FBG). As will be known by those having ordinary skill in the art, FBG is a periodic or aperiodic variation in the refractive index of an optical fiber core and/or cladding. This variation in the refractive index results in a range of wavelengths (e.g., a narrow range) being reflected rather than transmitted, with maximum reflectivity occurring at the Bragg wavelength.

Fiber Bragg Grating is commonly written into an optical fiber by exposing the optical fiber to an intense source of ultraviolet light (e.g., a UV laser). In this respect, UV photons may have enough energy to break molecular bonds within an optical fiber, which alters the structure of the optical fiber, thereby increasing the optical fiber's refractive index. Moreover, dopants (e.g., boron or germanium) and/or hydrogen loading can be employed to increase photosensitivity.

In order to expose a coated glass fiber to UV light for the creation of FBG, the coating may be removed. Alternatively, coatings that are transparent at the particular UV wavelengths (e.g., the UV wavelengths emitted by a UV laser to write FBG) may be employed to render coating removal unnecessary. In addition, silicone, polyimide, acrylate, or PFCB coatings, for instance, may be employed for high-temperature applications.

A particular FBG pattern may be created by employing (i) a photomask placed between the UV light source and the optical fiber, (ii) interference between multiple UV light beams, which interfere with each other in accordance with the desired FBG pattern (e.g., a uniform, chirped, or titled pattern), or (iii) a narrow UV light beam for creating individual variations. The FBG structure may have, for example, a uniform positive-only index change, a Gaussian-apodized index change, a raised-cosine-apodized index change, or a discrete phase-shift index change. Multiple FBG patterns may be combined on a single optical fiber.

Optical fibers having FBG may be employed in various sensing applications (e.g., for detecting vibration, temperature, pressure, moisture, or movement). In this respect, changes in the optical fiber (e.g., a change in temperature) result in a shift in the Bragg wavelength, which is measured by a sensor. FBG may be used to identify a particular optical fiber (e.g., if the optical fiber is broken into pieces).

Fiber Bragg Grating may also be used in various active or passive communication components (e.g., wavelength-selective filters, multiplexers, demultiplexers, Mach-Zehnder interferometers, distributed Bragg reflector lasers, pump/laser stabilizers, and supervisory channels).

To supplement the present disclosure, this application incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Pat. No. 7,623,747 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (Bigot-Astruc et al.); U.S. Pat. No. 7,526,177 for a Fluorine-Doped Optical Fiber (Matthijsse et al.); U.S. Pat. No. 7,555, 186 for an Optical Fiber (Flammer et al.); U.S. Pat. No. 8,055,111 for a Dispersion-Shifted Optical Fiber (Sillard et al.); U.S. Pat. No. 8,041,172 for a Transmission Optical Fiber Having Large Effective Area (Sillard et al.); International Patent Application Publication No. WO 2009/062131 A1 for a Microbend-Resistant Optical Fiber (Overton); U.S. Pat. No. 8,265,442 for a Microbend-Resistant Optical Fiber (Overton); U.S. Pat. No. 8,145,025 for a Single-Mode Optical Fiber Having Reduced Bending Losses (de Montmorillon et al.); U.S. Pat. No. 7,889,960 for a Bend-Insensitive Single-Mode Optical Fiber (de Montmorillon et al.); U.S. Patent Application Publication No. US2010/0021170 A1 for a Wavelength Multiplexed Optical System with Multimode Optical Fibers (Lumineau et al.); U.S. Pat. No. 7,995,888 for a Multimode Optical Fibers (Gholami et al.); U.S. Patent Application Publication No. US2010/0119202 A1 for a Reduced-Diameter Optical Fiber (Overton); U.S. Patent Application Publication No. US2010/0142969 A1 for a Multimode Optical System (Gholami et al.); U.S. Pat. No. 8,259,389 for an Amplifying Optical Fiber and Method of Manufacturing (Pastouret et al.); U.S. Patent Application Publication No. US2010/0135627 A1 for an Amplifying Optical Fiber and Production Method (Pastouret et al.); U.S. Patent Application Publication No. US2010/0142033 for an Ionizing Radiation-Resistant Optical Fiber Amplifier (Regnier et al.); U.S. Pat. No. 8,274,647 for a Method of Classifying a Graded-Index Multimode Optical Fiber (Gholami et al.); U.S. Patent Application Publication No. US2010/0189397 A1 for a Single-Mode Optical Fiber (Richard et al.); U.S. Patent Application Publication No. US2010/0189399 A1 for a Single-Mode Optical Fiber Having an Enlarged Effective Area (Sillard et al.); U.S. Patent Application Publication No. US2010/0189400 A1 for a Single-Mode Optical Fiber (Sillard et al.); U.S. Patent Application Publication No. US2010/0214649 A1 for an Optical Fiber Amplifier Having Nanostructures (Burow et al.); U.S. Pat. No. 8,009,950 for a Multimode Fiber (Molin et al.); U.S. Patent Application Publication No. US2010/0310218 A1 for a Large Bandwidth Multimode Optical Fiber Having a Reduced Cladding Effect (Molin et al.); U.S. Patent Application Publication No. US2011/0058781 A1 for a Multimode Optical Fiber Having Improved Bending Losses (Molin et al.); U.S. Patent Application Publication No. US2011/0064367 A1 for a Multimode Optical Fiber (Molin et al.); U.S. Patent Application Publication No. US2011/0069724 A1 for an Optical Fiber for Sum-Frequency Generation (Richard et al.); U.S. Patent Application Publication No. US2011/0116160 A1 for a Rare-Earth-Doped Optical Fiber Having Small Numerical Aperture (Boivin et al.); U.S. Pat. No. 8,280,213 for a High-Bandwidth, Multimode Optical Fiber with Reduced Cladding Effect (Molin et al.); U.S. Patent Application Publication No. US2011/0123162 A1 for a High-Bandwidth, Dual-Trench-Assisted Multimode Optical Fiber (Molin et al.); U.S. Patent Application Publication No. US2011/0135262 A1 for a Multimode Optical Fiber with Low Bending Losses and Reduced Cladding Effect (Molin et al.); U.S. Patent Application Publication No. US2011/0135263 A1 for a High-Bandwidth Multimode Optical Fiber Having Reduced Bending Losses (Molin et al.); U.S. Patent Application Publication No. US2011/0188826 A1 for a Non-Zero Dispersion Shifted Optical Fiber Having a Large Effective Area (Sillard et al.); U.S. Patent Application Publication No. US2011/0188823 A1 for a Non-Zero Dispersion Shifted Optical Fiber Having a Short Cutoff Wavelength (Sillard et al.); U.S. Patent Application Publication No. 2011/0217012 A1 for a Broad-Bandwidth Multimode Optical Fiber Having Reduced Bending Losses (Bigot-Astruc et al.); U.S. Patent Application Publication No. 2011/0229101 A1 for a Single-Mode Optical Fiber (de Montmorillon et al.); U.S. Patent Application Publication No. 2012/0051703 A1 for a Single-Mode Optical Fiber (Bigot-Astruc et al.); U.S. Patent Application Publication No. 2012/0040184 A1 for a Method of Fabricating an Optical Fiber Preform (de Montmorillon et al.); U.S. Patent Application Publication No. 2012/0092651 A1 for a Multimode Optical Fiber Insensitive to Bending Losses (Molin et al.); U.S. Patent Application Publication No. 2012/0134376 A1 for a Radiation-Insensitive Optical Fiber Doped with Rare Earths (Burov et al.); U.S. Patent Application Publication No. 2012/0148206 A1 for a Rare-Earth-Doped Optical Fiber (Boivin et al.); U.S. Patent Application Publication No. 2012/0195549 A1 for a Broad-Bandwidth Optical Fiber (Molin et al.); U.S. Patent Application Publication No. 2012/0195561 A1 for a Multimode Optical Fiber (Molin et al.); U.S. Patent Application Publication No. 2012/00224254 A1 for a Rare-Earth-Doped Amplifying Optical Fiber (Burov et al.); U.S. patent application Ser. No. 13/428,520 for a Bend-Resistant Multimode Optical Fiber, filed Mar. 23, 2012, (Molin et al.); U.S. patent application Ser. No. 13/434,101 for a Multimode Optical Fiber, filed Mar. 29, 2012, (Molin et al.); U.S. patent application Ser. No. 13/456,562 for a High-Bandwidth, Radiation-Resistant Multimode Optical Fiber, filed Apr. 26, 2012, (Krabshuis et al.); U.S. patent application Ser. No. 13/481,150 for a Single-Mode Optical Fiber, filed May 25, 2012, (Sillard et al.); U.S. patent application Ser. No. 13/491,953 for a Single-Mode Optical Fiber, filed Jun. 8, 2012, (Sillard et al.) and U.S. patent application Ser. No. 13/534,793 for a Multimode Optical Fiber, filed Jun. 27, 2012, (Bigot-Astruc et al.).

To supplement the present disclosure, this application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables;

U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,702,204 for a Method for Manufacturing an Optical Fiber Preform (Gonnet et al.); U.S. Pat. No. 7,570,852 for an Optical Fiber Cable Suited for Blown Installation or Pushing Installation in Microducts of Small Diameter (Nothofer et al.); U.S. Pat. No. 7,646,954 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Pat. No. 7,817,891 for a Method for Accessing Optical Fibers within a Telecommunication Cable (Lavenne et al.); U.S. Pat. No. 7,639,915 for an Optical Fiber Cable Having a Deformable Coupling Element (Parris et al.); U.S. Pat. No. 7,646,952 for an Optical Fiber Cable Having Raised Coupling Supports (Parris); U.S. Pat. No. 7,724,998 for a Coupling Composition for Optical Fiber Cables (Parris et al.); U.S. Patent Application Publication No. US2009/0214167 A1 for a Buffer Tube with Hollow Channels (Lookadoo et al.); U.S. Patent Application Publication No. US2009/0297107 A1 for an Optical Fiber Telecommunication Cable (Tatat); U.S. Pat. No. 8,195,018 for a Buffer Tube with Adhesively Coupled Optical Fibers and/or Water-Swellable Element; U.S. Patent Application Publication No. US2010/0092135 A1 for an Optical Fiber Cable Assembly (Barker et al.); U.S. Pat. No. 7,974,507 A1 for a High-Fiber-Density Optical Fiber Cable (Louie et al.); U.S. Pat. No. 7,970,247 for a Buffer Tubes for Mid-Span Storage (Barker); U.S. Pat. No. 8,081,853 for Single-Fiber Drop Cables for MDU Deployments (Overton); U.S. Pat. No. 8,041,167 for an Optical-Fiber Loose Tube Cables (Overton); U.S. Pat. No. 8,145,026 for a Reduced-Size Flat Drop Cable (Overton et al.); U.S. Pat. No. 8,165,439 for ADSS Cables with High-Performance Optical Fiber (Overton); U.S. Pat. No. 8,041,168 for Reduced-Diameter Ribbon Cables with High-Performance Optical Fiber (Overton); U.S. Pat. No. 8,031,997 for a Reduced-Diameter, Easy-Access Loose Tube Cable (Overton); U.S. Patent Application Publication No. US2010/ 0150505 A1 for a Buffered Optical Fiber (Testu et al.); U.S. Patent Application Publication No. US2010/0154479 A1 for a Method and Device for Manufacturing an Optical Preform (Milicevic et al.); U.S. Patent Application Publication No. US2010/0166375 for a Perforated Water-Blocking Element (Parris); U.S. Patent Application Publication No. US2010/0183821 A1 for a UVLED Apparatus for Curing Glass-Fiber Coatings (Hartsuiker et al.); U.S. Patent Application Publication No. US2010/0202741 A1 for a Central-Tube Cable with High-Conductivity Conductors Encapsulated with High-Dielectric-Strength Insulation (Ryan et al.); U.S. Patent Application Publication No. US2010/0215328 A1 for a Cable Having Lubricated, Extractable Elements (Tatat et al.); U.S. Patent Application Publication No. US2011/0026889 A1 for a Tight-Buffered Optical Fiber Unit Having Improved Accessibility (Risch et al.); U.S. Patent Application Publication No. US2011/0064371 A1 for Methods and Devices for Cable Insertion into Latched Conduit (Leatherman et al.); U.S. Patent Application Publication No. 2011/0069932 A1 for a High-Fiber-Density Optical-Fiber Cable (Overton et al.); U.S. Patent Application Publication No. 2011/0091171 A1 for an Optical-Fiber Cable Having High Fiber Count and High Fiber Density (Tatat et al.); U.S. Patent Application Publication No. 2011/0176782 A1 for a Water-Soluble Water-Blocking Element (Parris); U.S. Patent Application Publication No. 2011/0268400 A1 for a Data-Center Cable (Louie et al.); U.S. Patent Application Publication No. 2011/0268398 A1 for a Bundled Fiber Optic Cables (Quinn et al.); U.S. Patent Application Publication No. 2011/0287195 A1 for a Curing Apparatus Employing Angled UVLEDs (Molin); U.S. Patent Application Publication No. 2012/0009358 for a Curing Apparatus Having UV Sources That Emit Differing Ranges of UV Radiation (Gharbi et al.); U.S. Patent Application Publication No. 2012/0014652 A1 for a Adhesively Coupled Optical Fibers and Enclosing Tape (Parris); U.S. Patent Application Publication No. 2012/0040105 A1 for a Method and Apparatus Providing Increased UVLED Intensity (Overton); U.S. Patent Application Publication No. 2012/0057833 A1 for an Optical-Fiber Module Having Improved Accessibility (Tatat); and U.S. Patent Application Publication No. 2012/0213483 A1 for a Optical-Fiber Interconnect Cable (Risch et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A multimode optical fiber, comprising:
a central core surrounded by an outer cladding, said central core having an outer radius $r_1$ and an alpha-index profile with respect to said outer cladding;
an inner cladding positioned between said central core and said outer cladding, said inner cladding having (i) an outer radius $r_2$, (ii) a width $w_2$, and (iii) a refractive index difference $\Delta n_2$ with respect to said outer cladding; and
a depressed trench positioned between said inner cladding and said outer cladding, said depressed trench having (i) an outer radius $r_t$, (ii) a width $w_t$, and (iii) a negative refractive index difference $\Delta n_t$ with respect to said outer cladding;
wherein said depressed trench has a negative volume V defined by the expression $V = 1000 \times w_t \times \Delta n_t$, said depressed trench's negative volume V having an absolute value of greater than 20 microns;

wherein, at a wavelength between about 840 nanometers and 860 nanometers, the multimode optical fiber exhibits a leaky-mode bandwidth ($EMB_{leaky}$) of about 2,550 MHz-km or greater at 400 meters.

2. The multimode optical fiber according to claim 1, wherein said inner cladding immediately surrounds said central core and said depressed trench immediately surrounds said inner cladding.

3. The multimode optical fiber according to claim 1, wherein said central core's outer radius $r_1$ is 25 microns±1.5 microns.

4. A multimode optical fiber, comprising:
a central core surrounded by an outer cladding, said central core having an outer radius $r_1$ and an alpha-index profile with respect to said outer cladding;
an inner cladding positioned between said central core and said outer cladding, said inner cladding having (i) an outer radius $r_2$, (ii) a width $w_2$, and (iii) a refractive index difference $\Delta n_2$ with respect to said outer cladding; and
a depressed trench positioned between said inner cladding and said outer cladding, said depressed trench having (i) an outer radius $r_t$, (ii) a width $w_t$, and (iii) a negative refractive index difference $\Delta n_t$ with respect to said outer cladding;
wherein said depressed trench has a negative volume V defined by the expression $V=1000 \times w_t \times \Delta n_t$, said depressed trench's negative volume V having an absolute value of greater than 20 microns;
wherein, at a wavelength between about 840 nanometers and 860 nanometers, the multimode optical fiber exhibits a leaky-mode bandwidth ($EMB_{leaky}$) of about 1,850 MHz-km or greater at 300 meters.

5. The multimode optical fiber according to claim 4, wherein said inner cladding immediately surrounds said central core and said depressed trench immediately surrounds said inner cladding.

6. The multimode optical fiber according to claim 4, wherein said central core's outer radius $r_1$ is 25 microns±1.5 microns.

7. The multimode optical fiber according to claim 4, wherein said inner cladding's width $w_2$ is between about 1 micron and 2 microns.

8. The multimode optical fiber according to claim 4, wherein said inner cladding's refractive index difference $\Delta n_2$ is between about $-0.5 \times 10^{-3}$ and $0.5 \times 10^{-3}$.

9. The multimode optical fiber according to claim 4, wherein said inner cladding's refractive index difference $\Delta n_2$ is between about $-0.05 \times 10^{-3}$ and $0.05 \times 10^{-3}$.

10. The multimode optical fiber according to claim 4, wherein said depressed trench's refractive index difference $\Delta n_t$ is between about $-15 \times 10^{-3}$ and $-3 \times 10^{-3}$.

11. The multimode optical fiber according to claim 4, wherein said depressed trench's width $w_t$ is between about 3 microns and 5 microns.

12. The multimode optical fiber according to claim 4, wherein said depressed trench has a volume V of between about −30 microns and −40 microns as defined by the expression $V=1000 \times w_t \times \Delta n_t$.

13. The multimode optical fiber according to claim 4, wherein at a wavelength of 850 nanometers, the multimode optical fiber has bending losses of (i) less than about 0.4 dB for two turns around a bend radius of 7.5 millimeters and (ii) less than about 1 dB for two turns around a bend radius of 5 millimeters.

14. The multimode optical fiber according to claim 4, wherein, for two turns around a bend radius of 7.5 millimeters at a wavelength of 850 nanometers, the multimode optical fiber has bending losses of less than about 0.2 dB.

15. The multimode optical fiber according to claim 4, wherein, for two turns around a bend radius of 5 millimeters at a wavelength of 850 nanometers, the multimode optical fiber has bending losses of less than about 0.3 dB.

16. The multimode optical fiber according to claim 4, wherein, with respect to said outer cladding, said central core has a maximum refractive index difference $\Delta n_2$ of between about $11 \times 10^{-3}$ and $16 \times 10^{-3}$.

17. The multimode optical fiber according to claim 4, wherein said central core's alpha-index profile has an alpha parameter α of between about 2.04 and 2.10.

18. The multimode optical fiber according to claim 4, wherein said inner cladding's width $w_2$ is less than about 5 microns.

19. The multimode optical fiber according to claim 1, wherein, with respect to said outer cladding, said central core has a maximum refractive index difference $\Delta n_1$ of between about $11 \times 10^{-3}$ and $16 \times 10^{-3}$.

20. The multimode optical fiber according to claim 4, wherein said central core's alpha-index profile has an alpha parameter α of between about 2.04 and 2.10.

21. The multimode optical fiber according to claim 4, wherein said inner cladding's width $w_2$ is less than about 5 microns.

22. The multimode optical fiber according to claim 4, wherein said inner cladding's width $w_2$ is between about 1 micron and 2 microns.

23. The multimode optical fiber according to claim 4, wherein said inner cladding's refractive index difference $\Delta n_2$ is between about $-0.5 \times 10^{-3}$ and $0.5 \times 10^{-3}$.

24. The multimode optical fiber according to claim 4, wherein said inner cladding's refractive index difference $\Delta n_2$ is between about $-0.05 \times 10^{-3}$ and $0.05 \times 10^{-3}$.

25. The multimode optical fiber according to claim 4, wherein said depressed trench's refractive index difference $\Delta n_t$ is between about $-15 \times 10^{-3}$ and $-3 \times 10^{-3}$.

26. The multimode optical fiber according to claim 4, wherein said depressed trench's width $w_t$ is between about 3 microns and 5 microns.

27. The multimode optical fiber according to claim 4, wherein said depressed trench has a volume V of between about −30 microns and −40 microns as defined by the expression $V=1000 \times w_t \times \Delta n_t$.

28. The multimode optical fiber according to claim 4, wherein at a wavelength of 850 nanometers, the multimode optical fiber has bending losses of (i) less than about 0.4 dB for two turns around a bend radius of 7.5 millimeters and (ii) less than about 1 dB for two turns around a bend radius of 5 millimeters.

29. The multimode optical fiber according to claim 5, wherein, at a wavelength between about 840 nanometers and 860 nanometers, the multimode optical fiber exhibits a leaky-mode bandwidth ($EMB_{leaky}$) of about 3,880 MHz-km or greater at 400 meters.

30. The multimode optical fiber according to claim 4, wherein, for two turns around a bend radius of 7.5 millimeters at a wavelength of 850 nanometers, the multimode optical fiber has bending losses of less than about 0.2 dB.

31. The multimode optical fiber according to claim 4, wherein, for two turns around a bend radius of 5 millimeters at a wavelength of 850 nanometers, the multimode optical fiber has bending losses of less than about 0.3 dB.

32. A multimode optical fiber, comprising:
a central core surrounded by an outer cladding, said central core having an outer radius $r_1$ and an alpha-index profile with respect to said outer cladding;
an inner cladding positioned between said central core and said outer cladding, said inner cladding having (i) an outer radius $r_2$, (ii) a width $w_2$, and (iii) a refractive index difference $\Delta n_2$ with respect to said outer cladding; and
a depressed trench positioned between said inner cladding and said outer cladding, said depressed trench having (i) an outer radius $r_t$, (ii) a width $w_t$, and (iii) a negative refractive index difference $\Delta n_t$ with respect to said outer cladding;
wherein said depressed trench has a negative volume V defined by the expression $V=1000 \times w_t \times \Delta n_t$, said depressed trench's negative volume V having an absolute value of greater than 20 microns;
wherein, at a wavelength of about 850 nanometers, the multimode optical fiber exhibits a leaky-mode bandwidth ($EMB_{leaky}$) of (i) about 1,850 MHz-km or greater at 300 meters and (ii) about 2,550 MHz-km or greater at 400 meters.

33. The multimode optical fiber according to claim 32, wherein said inner cladding immediately surrounds said central core and said depressed trench immediately surrounds said inner cladding.

34. The multimode optical fiber according to claim 32, wherein, with respect to said outer cladding, said central core has a maximum refractive index difference $\Delta n_2$ of between about $12 \times 10^{-3}$ and $15 \times 10^{-3}$.

35. The multimode optical fiber according to claim 32, wherein, wherein (i) said central core's outer radius $r_1$ is 25 microns±1.5 microns and (ii) said central core's alpha-index profile has an alpha parameter α of between about 1.9 and 2.1.

36. The multimode optical fiber according to claim 32, wherein, wherein said inner cladding's width $w_2$ is between about 1 micron and 3 microns.

37. The multimode optical fiber according to claim 32, wherein said inner cladding's refractive index difference $\Delta n_2$ is between about $-0.2 \times 10^{-3}$ and $0.2 \times 10^{-3}$.

38. The multimode optical fiber according to claim 32, wherein said depressed trench's refractive index difference $\Delta n_t$ is between about $-10 \times 10^{-3}$ and $-5 \times 10^{-3}$.

39. The multimode optical fiber according to claim 32, wherein said depressed trench's negative volume V has an absolute value of greater than 20 microns and less than 40 microns.

40. The multimode optical fiber according to claim 32, wherein, at a wavelength of 850 nanometers, the multimode optical fiber has bending losses of (i) less than about 0.2 dB for two turns around a bend radius of 7.5 millimeters and (ii) less than about 0.3 dB for two turns around a bend radius of 5 millimeters.

41. An optical-fiber system comprising the multimode optical fiber according to claim 32.

* * * * *